United States Patent
Tanaka et al.

(10) Patent No.: US 10,462,753 B2
(45) Date of Patent: Oct. 29, 2019

(54) COMMUNICATION DEVICE, COMMUNICATION METHOD AND PROGRAM

(71) Applicant: SONY CORPORATION, Tokyo (JP)

(72) Inventors: Yusuke Tanaka, Tokyo (JP); Yuichi Morioka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 35 days.

(21) Appl. No.: 15/548,014

(22) PCT Filed: Dec. 7, 2015

(86) PCT No.: PCT/JP2015/084333
§ 371 (c)(1),
(2) Date: Aug. 1, 2017

(87) PCT Pub. No.: WO2016/143208
PCT Pub. Date: Sep. 15, 2016

(65) Prior Publication Data
US 2018/0027508 A1 Jan. 25, 2018

(30) Foreign Application Priority Data
Mar. 6, 2015 (JP) ................ 2015-045001

(51) Int. Cl.
*H04W 52/36* (2009.01)
*H04W 16/28* (2009.01)
(Continued)

(52) U.S. Cl.
CPC ........... *H04W 52/36* (2013.01); *H04W 16/28* (2013.01); *H04W 52/245* (2013.01);
(Continued)

(58) Field of Classification Search
CPC . H04W 52/36; H04W 52/367; H04W 52/245; H04W 52/281; H04W 16/28; H04W 84/12; H04W 52/34; H04W 52/28
See application file for complete search history.

(56) References Cited

U.S. PATENT DOCUMENTS

| 7,430,435 B2* | 9/2008 | Choi ................ H04W 52/265 |
| | | 455/522 |
| 2006/0199602 A1* | 9/2006 | Zinn ................ H04W 52/48 |
| | | 455/522 |

(Continued)

FOREIGN PATENT DOCUMENTS

| EP | 2 557 861 A1 | 2/2013 |
| JP | 2011-223107 A | 11/2011 |

(Continued)

OTHER PUBLICATIONS

International Search Report dated Jan. 19, 2016, in PCT/JP2015/084333 filed Dec. 7, 2015.

(Continued)

*Primary Examiner* — Jay P Patel
(74) *Attorney, Agent, or Firm* — Xsensus, LLP

(57) ABSTRACT

A communication method, program, and communication device that selects other communication devices capable of setting transmission power such that reception power falls within a predetermined range, from a plurality of other communication devices that perform multiplexing communication, and transmits a transmission power setting request indicating the transmission power to each of the other selected communication devices.

12 Claims, 32 Drawing Sheets

(51) Int. Cl.
  *H04W 52/28* (2009.01)
  *H04W 52/34* (2009.01)
  *H04W 84/12* (2009.01)
  *H04W 52/24* (2009.01)

(52) U.S. Cl.
  CPC ......... *H04W 52/28* (2013.01); *H04W 52/281* (2013.01); *H04W 52/34* (2013.01); *H04W 52/367* (2013.01); *H04W 84/12* (2013.01)

(56) References Cited

U.S. PATENT DOCUMENTS

| | | | | |
|---|---|---|---|---|
| 2008/0151801 A1* | 6/2008 | Mizuta | ................ | H04W 52/343 370/311 |
| 2011/0205966 A1 | 8/2011 | Iwai et al. | | |
| 2012/0083902 A1* | 4/2012 | Daum | ................ | H04B 3/542 700/3 |
| 2013/0058293 A1 | 3/2013 | Nishikawa et al. | | |
| 2013/0279457 A1 | 10/2013 | Takano | | |
| 2013/0343331 A1* | 12/2013 | Ode | ................ | H04B 7/024 370/329 |
| 2015/0111596 A1* | 4/2015 | Ruuska | ................ | H04W 16/14 455/454 |
| 2015/0200569 A1* | 7/2015 | Umeda | ................ | H02J 5/005 307/104 |
| 2016/0044612 A1* | 2/2016 | Yamamoto | ............ | H04W 52/42 455/522 |
| 2017/0325177 A1* | 11/2017 | Liu | ................ | H04W 52/143 |

FOREIGN PATENT DOCUMENTS

| | | |
|---|---|---|
| JP | 2013-516871 A | 5/2013 |
| WO | WO 2009/153978 A1 | 12/2009 |
| WO | 2010/051520 A1 | 5/2010 |

OTHER PUBLICATIONS

Nishikawa et al., "Investigation on Resource Assignment and Power Control Schemes for Uplink MU-MIMO in Multi-cell Environments for LTE/LTE-Advanced", 2010 $16^{TH}$ Asia-Pacific Conference on Communications (APCC), (2010), pp. 319-323.

IEEE Computer Society, "Part 11: Wireless LAN Medium Access Control (MAC) and Physical Layer (PHY) Specifications, Amendment 4: Enhancements for Very High Throughput for Operation in Bands below 6 GHz", IEEE Std. 802. 11ac™, IEEE Standards Association, IEEE Standard for Information Technology—Telecommunications and information exchange between systems Local and metropolitan area networks—Specific requirements, (2013), 423 pages.

IEEE Computer Society, "Part 11: Wireless Lan Medium Access Control (MAC) and Physical Layer (PHY) Specifications", IEEE Std. 802.11™, IEEE Standards Association, IEEE Standard for Information technology—Telecommunications and information exchange between systems Local and metropolitan area networks—Specific requirements, (2012), 2,791 pages.

Extended Search Report issued in European Application 15884692.3-1219 dated Sep. 20, 2018.

* cited by examiner

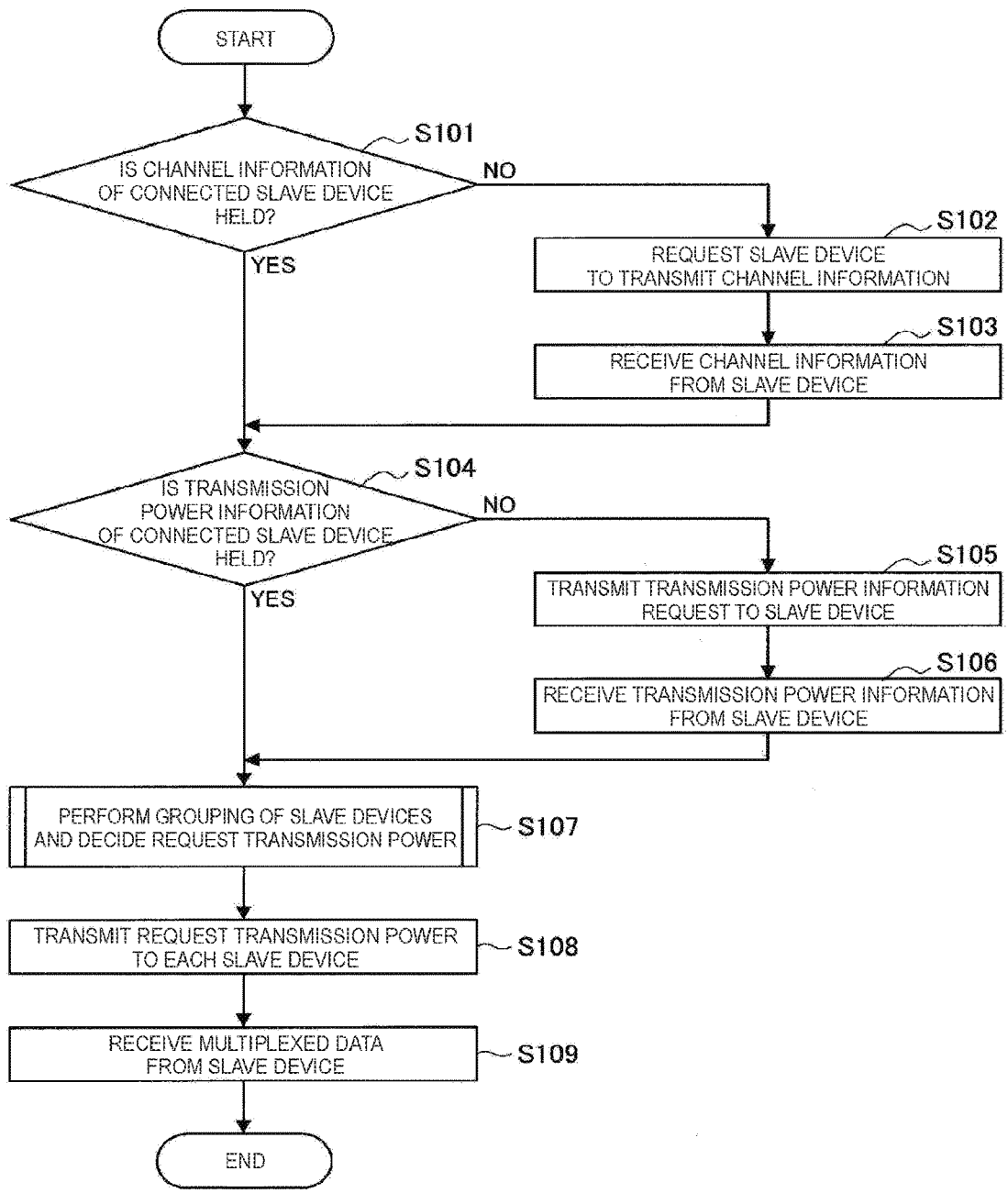

FIG.9

| Element ID | Length | MINIMUM TRANSMISSION POWER | | | MAXIMUM TRANSMISSION POWER | | |
|---|---|---|---|---|---|---|---|
| | | BANDWIDTH 1 | ... | BANDWIDTH N | BANDWIDTH 1 | ... | BANDWIDTH N |
| OCTET 1 | 1 | | N | | | N | |

FIG.10

| Element ID | Length | MCS 1 | ... | MCS N | MCS 1 | ... | MCS N |
|---|---|---|---|---|---|---|---|
| | | | MINIMUM TRANSMISSION POWER | | | MAXIMUM TRANSMISSION POWER | |

OCTET: 1, 1, N, N

FIG. 11

| Element ID | Length | MINIMUM TRANSMISSION POWER | | | MAXIMUM TRANSMISSION POWER | | |
|---|---|---|---|---|---|---|---|
| | | FREQUENCY 1 | ... | FREQUENCY N | FREQUENCY 1 | ... | FREQUENCY N |
| OCTET 1 | 1 | | N | | | N | |

FIG.13

| Element ID | Length | MINIMUM TRANSMISSION POWER | | | MAXIMUM TRANSMISSION POWER | | |
|---|---|---|---|---|---|---|---|
| | | TRAFFIC PRIORITY 1 | ... | TRAFFIC PRIORITY N | TRAFFIC PRIORITY 1 | ... | TRAFFIC PRIORITY N |
| 1 | 1 | | N | | | N | |

OCTET

FIG.15

| Element ID | Length | MINIMUM TRANSMISSION POWER | MAXIMUM TRANSMISSION POWER | TRANSMISSION POWER 1 | POWER CONSUMPTION 1 | ... | TRANSMISSION POWER N | POWER CONSUMPTION N |
|---|---|---|---|---|---|---|---|---|
| 1 | 1 | 1 | 1 | | | x | | |

OCTET

FIG.16

| Element ID | Length | MINIMUM TRANSMISSION POWER | MAXIMUM TRANSMISSION POWER | ORDER | COEFFICIENT 1 | COEFFICIENT 2 | ... | COEFFICIENT N |
|---|---|---|---|---|---|---|---|---|
| 1 | 1 | 1 | 1 | | | | x | |

OCTET

FIG.18

| Element ID | Length | MINIMUM TRANSMISSION POWER | MAXIMUM TRANSMISSION POWER | HIGH-EFFICIENCY TRANSMISSION POWER |
|---|---|---|---|---|
| 1 | 1 | 1 | 1 | 1 |

OCTET

FIG.20

| Element ID | Length | MINIMUM TRANSMISSION POWER | MAXIMUM TRANSMISSION POWER | GOOD CHARACTERISTIC TRANSMISSION POWER |
|---|---|---|---|---|
| 1 | 1 | 1 | 1 | 1 |

OCTET

FIG.22

| Element ID | Length | MINIMUM TRANSMISSION POWER | MAXIMUM TRANSMISSION POWER | POWER SOURCE INFORMATION |
|---|---|---|---|---|
| 1 | 1 | 1 | 1 | X |

OCTET

COMMUNICATION DEVICE, COMMUNICATION METHOD AND PROGRAM

TECHNICAL FIELD

The present disclosure relates to a communication device, a communication method and a program.

BACKGROUND ART

Wireless Local Area Networks (LANs) represented by Institute of Electrical and Electronics Engineers (IEEE) 802.11 have become widespread in recent years, and wireless communication devices compatible with wireless LANs are increasing accordingly. In this regard, in order to improve communication efficiency of individual wireless communication devices and an entire network, the IEEE 802.11 standard is still currently being expanded.

As an example of the extension of the standard, Multi-User Multi-Input Multi-Output (MU-MIMO) for downlink (DL) is employed in the 802.11ac standard. MU-MIMO is a technique that enables a plurality of signals to be transmitted in the same time zone at the same frequency through space division multiplexing.

Here, a range of transmission power that can be set in wireless communication devices is generally regulated in accordance with a law or the like for each region. For this reason, wireless communication devices transmit radio waves at the transmission power according to the regulation.

For example, a technique in which, in a network configured with a slave device and a base station, the slave device transmits baseband a range of transmission power which is settable by the slave device (hereinafter also referred to as a "transmission output adjustable range") to the base station, and the base station gives a notification indicating a maximum transmission power of each region and a reduction request value of transmission power to the slave device is disclosed in Non-Patent Literatures 1 and 2.

Further, since the number of wireless communication devices is increasing as described above, it is desired to efficiently perform signaling for transmission power control disclosed in Non-Patent Literatures 1 and 2.

On the other hand, for example, a communication system in which a base station groups a plurality of slave devices to be connected and perform signaling for transmission power control in units of groups is disclosed in Patent Literature 1.

CITATION LIST

Patent Literature

Patent Literature 1: JP 2013-516871T

Non-Patent Literature

Non-Patent Literature 1: IEEE Std 802.11-2012, IEEE Standard for Information technology-Telecommunications and information exchange between systems-Local and metropolitan area networks-Specific requirements-Part 11: WLAN MAC and PHY specifications, pp. 1044-1046

Non-Patent Literature 2: IEEE Std 802.11ac-2013, IEEE Standard for Information technology-Telecommunications and information exchange between systems-Local and metropolitan area networks-Specific requirements-Part 11: Wireless LAN Medium Access Control (MAC) and Physical Layer (PHY) specifications-Amendment 4: Enhancements for Very High Throughput for Operation in Bands below 6 GHz, pp. 176-178

DISCLOSURE OF INVENTION

Technical Problem

However, in the techniques disclosed in Non-Patent Literatures 1 and 2 and Patent Literature 1, when the transmission power control is performed in multiplexing communication, communication errors may increase. For example, when a notification of signaling designating a transmission power is given to each of communication devices belonging to a group related to the multiplexing communication, if it is difficult to set the designated transmission power in some communication devices among communication devices which receive the notification, a density of reception signals received from the communication devices in the group may vary. As a result, a reception characteristic such as a signal to noise (SN) ratio deteriorates, leading to a deterioration in an error rate.

In this regard, the present disclosure proposes a communication device, a communication method, and a program, which are novel and improved and capable of controlling the transmission power while suppressing an increase in communication errors in the multiplexing communication.

Solution to Problem

According to the present disclosure, there is provided a communication device including: a control unit configured to select other communication devices capable of setting transmission power such that reception power falls within a predetermined range, from a plurality of other communication devices that perform multiplexing communication; and a communication unit configured to transmit a transmission power setting request indicating the transmission power to each of the other communication devices selected by the control unit.

In addition, according to the present disclosure, there is provided a communication device including a communication unit configured to transmit transmission power information indicating a settable transmission power range and receive a transmission power setting request indicating transmission power settable by the own device; and a control unit configured to set transmission power of the own device on the basis of the transmission power setting request received by the communication unit. The communication unit performs multiplexing communication at the transmission power set by the control unit.

In addition, according to the present disclosure, there is provided a communication method including: selecting, by a control unit, other communication devices capable of setting transmission power such that reception power falls within a predetermined range, from a plurality of other communication devices that perform multiplexing communication; and transmitting a transmission power setting request indicating the transmission power to each of the other communication devices selected by the control unit.

In addition, according to the present disclosure, there is provided a communication method including: transmitting, by a communication unit, transmission power information indicating a settable transmission power range and receiving a transmission power setting request indicating transmission power settable by an own device; setting transmission power of the own device on the basis of the transmission power setting request received by the communication unit; and performing multiplexing communication at the set transmission power.

In addition, according to the present disclosure, there is provided a program causing a computer to implement: a control function of selecting other communication devices capable of setting transmission power such that reception power falls within a predetermined range, from a plurality of other communication devices that perform multiplexing communication; and a communication function of transmitting a transmission power setting request indicating the transmission power to each of the other communication devices selected by the control function.

In addition, according to the present disclosure, there is provided a program causing a computer to implement: a communication function of transmitting transmission power information indicating a settable transmission power range and receiving a transmission power setting request indicating transmission power settable by an own device; a control function of setting transmission power of the own device to the transmission power indicated by the transmission power setting request received by the communication function; and a function of performing multiplexing communication at the transmission power set by the control function.

Advantageous Effects of Invention

As described above, the present disclosure provides a communication device, a communication method, and a program, which are capable of controlling the transmission power while suppressing an increase in communication errors in the multiplexing communication. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of a configuration of a transmission power information notification transmitted by a slave device according to the present embodiment.

FIG. 6 is a flowchart conceptually illustrating a process overview of a base station according to the present embodiment.

FIG. 9 is a diagram illustrating a configuration example of a transmission power information notification in a first modified example of the present embodiment.

FIG. 10 is a diagram illustrating another configuration example of the transmission power information notification in the first modified example of the present embodiment.

FIG. 11 is a diagram illustrating another configuration example of the transmission power information notification in the first modified example of the present embodiment.

FIG. 13 is a diagram illustrating a configuration example of a transmission power information notification in a second modified example of the present embodiment.

FIG. 15 is a diagram illustrating a configuration example of a transmission power information notification to which power consumption information transmitted by a slave device according to a second embodiment of the present disclosure is added.

FIG. 16 is a diagram illustrating a configuration example of a transmission power information notification to which another form of power consumption information transmitted by a slave device according to the present embodiment is added.

FIG. 18 is a diagram illustrating a configuration example of a transmission power information notification in a first modified example of the present embodiment.

FIG. 20 is a diagram illustrating another configuration example of the transmission power information notification in the first modified example of the present embodiment.

FIG. 22 is a diagram illustrating a configuration example of a transmission power information notification in a second modified example of the present embodiment.

MODE(S) FOR CARRYING OUT THE INVENTION

Figure 1:
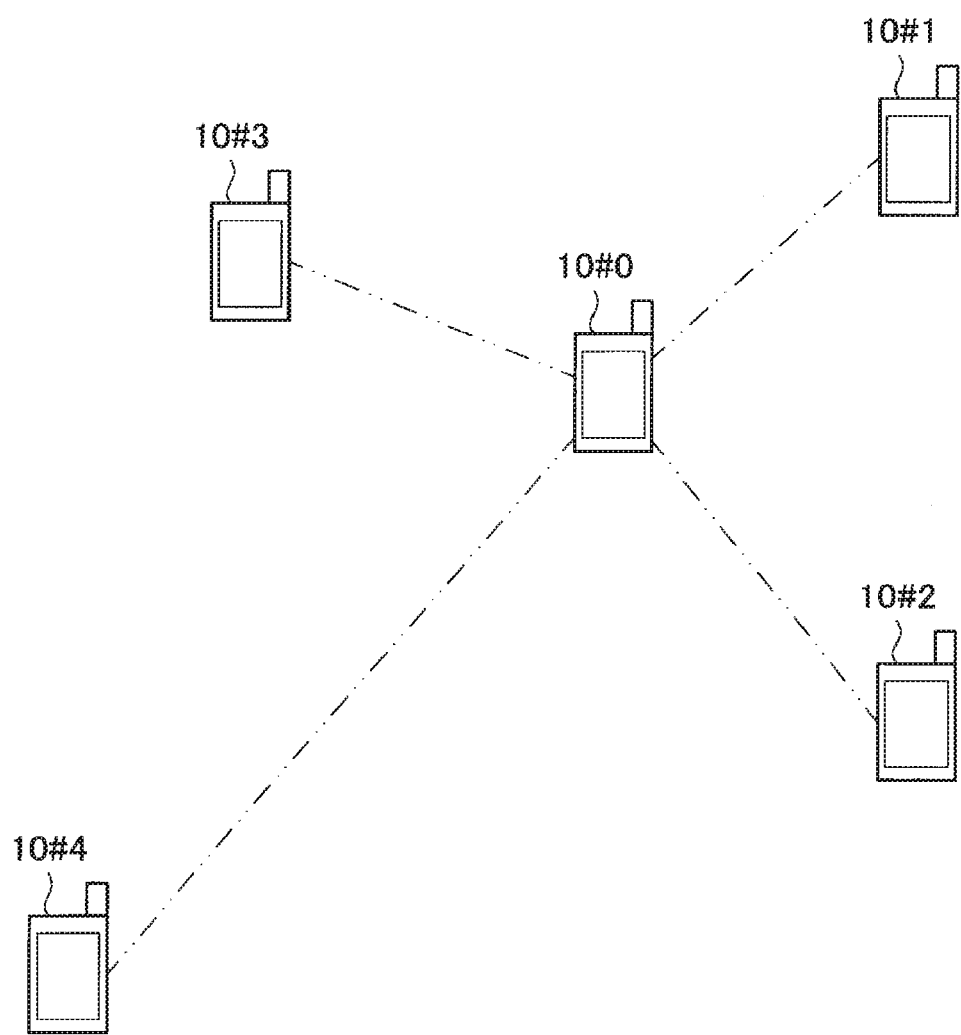
FIG. 1 is a diagram illustrating a communication system configured with communication devices according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Overview of communication device according to one embodiment of present disclosure
2. First embodiment (grouping based on transmission output adjustable range)
3. Second embodiment (grouping based on other information related to transmission power)
4. Third embodiment (re-execution of grouping)
5. Application example
6. Conclusion

1. OVERVIEW OF COMMUNICATION DEVICE ACCORDING TO ONE EMBODIMENT OF PRESENT DISCLOSURE

First, an overview of a communication device according to one embodiment of the present disclosure will be described with reference to FIG. 1. FIG. 1 is a diagram illustrating a communication system configured with communication devices according to one embodiment of the present disclosure.

The communication system is configured with a plurality of communication devices 10. The communication devices 10 have a wireless communication function and perform communication using multiplexing. Also, the communication devices 10 operate as APs or terminals. Hereinafter, a communication device operating as an AP will also be referred to as a base station, and communication devices operating as terminals will be referred to as slave units. For this reason, in the communication system, one-to-multiple communication using multiplexing is possible between the base station and the slave units. Here, communication from the base station to the slave units is referred to as downlink (DL) communication, and communication from the slave units to the base station is referred to as uplink (UL) communication.

For example, as shown in FIG. 1, the communication system includes a plurality of communication devices 10#0 to 10#4. The communication device 10#0 which is a base station and the communication devices 10#1 to 10#4 which are slave units are connected through wireless communication and directly transmit and receive frames to and from each other. For example, the base station 10#0 is a communication device conforming to IEEE802.11ac, and performs space-division multiple access (SDMA) using an adaptive array antenna.

Here, when the multiplexing communication is performed, grouping of slave devices that perform transmission is important. For example, when the power densities of the reception signals from the slave devices of the same group are different from each other, the SN ratios of the reception signals from some slave devices are likely to decrease.

On the other hand, controlling the transmission powers of the slave devices so that the power densities of the reception signals are uniform between the slave devices can be considered. However, in the transmission power control, it may be difficult for the slave device to set the transmission power necessary for the slave device. In this case, when transmission of the slave device which is given a notification of the transmission power outside the transmission output adjustable range is not suppressed, the density of the reception signal received from each of the slave devices varies, and reception characteristics such as the SN ratio deteriorate, leading to an increase in the error rate. Further, when the transmission of the slave device which is given the notification of the transmission power outside the transmission output adjustable range is suppressed, transmission opportunities of the slave device decrease, and the communication efficiency decreases.

In this regard, the present disclosure proposes a communication device which is capable of controlling the transmission power while suppressing the increase in communication errors in the multiplexing communication. This will be described below in detail. In FIG. 1, the example in which the communication device 10#0 is a base station has been described as an example of the communication system, but another communication device 10 may be a base station, or the communication device 10#0 may be a communication device having a plurality of direct links with other communication devices 10#1 to 10#4. In the latter case, DL described above can be interpreted as "simultaneous transmission from one device to a plurality of devices," and UL described above can be interpreted as "simultaneous transmission from a plurality of devices to one device." Further, for the sake of convenience of description, the communication devices 10 according to the first to third embodiments are distinguished by adding numbers corresponding to the embodiments at the end as in a communication device 10-1 and a communication device 10-2.

2. FIRST EMBODIMENT (GROUPING BASED ON TRANSMISSION OUTPUT ADJUSTABLE RANGE)

The overview of the communication device according to one embodiment of the present disclosure has been described above. Next, a communication device 10-1 according to a first embodiment of the present disclosure will be described.

2-1. Configuration of Device

Figure 2:
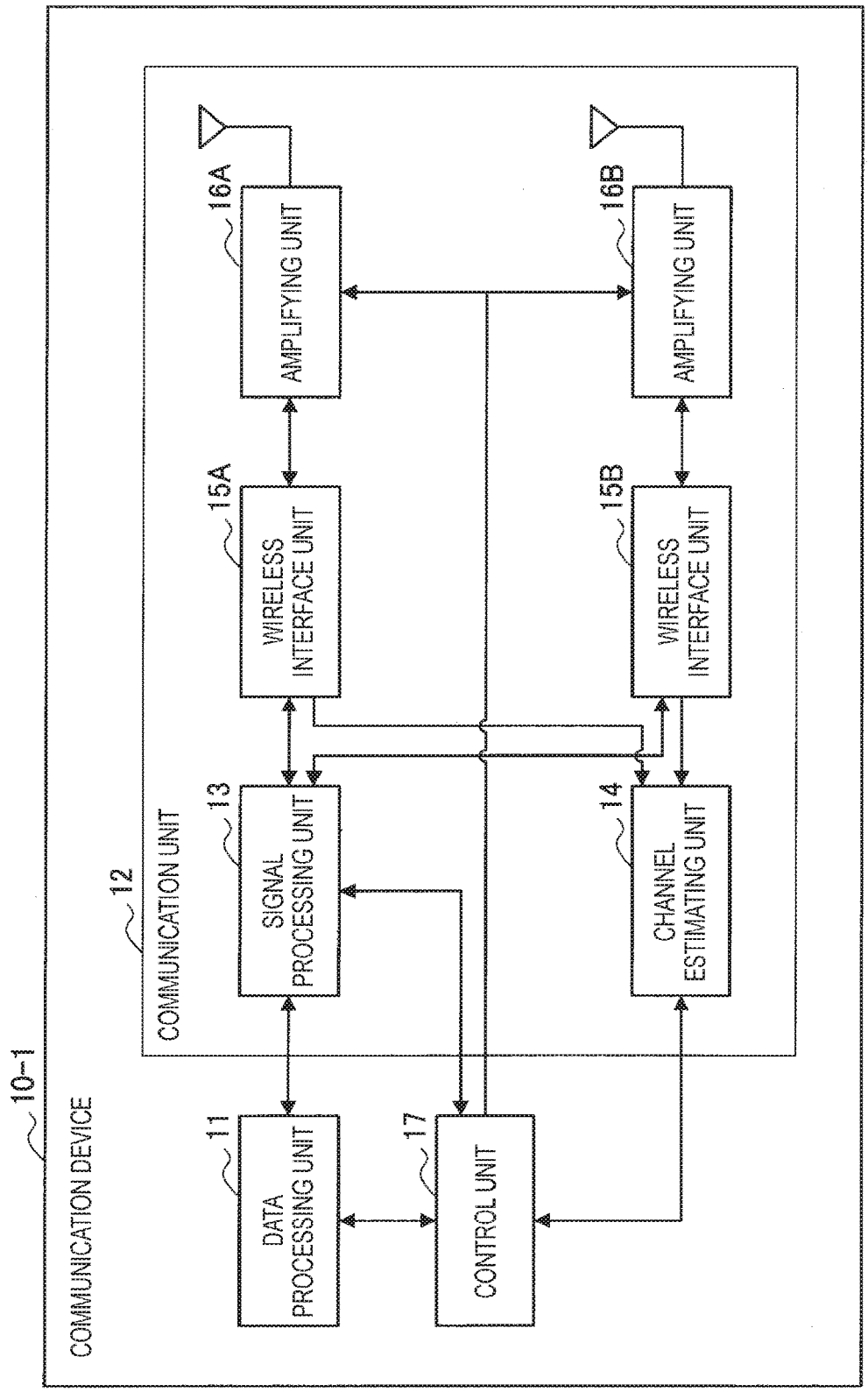
FIG. 2 is a block diagram illustrating a schematic functional configuration of a communication device according to a first embodiment of the present disclosure.

First, a configuration of the communication device 10-1 according to the first embodiment of the present disclosure will be described with reference to FIG. 2. FIG. 2 is a block diagram illustrating a schematic functional configuration of the communication device 10-1 according to the first embodiment of the present disclosure.

As illustrated in FIG. 2, the communication device 10-1 includes a data processing unit 11, a communication unit 12, and a control unit 17. First, basic functions of the communication device 10-1 will be described.

((Basic Functions))

The data processing unit 11 performs a process for transmission and reception of data. Specifically, the data processing unit 11 generates a frame on the basis of data from a higher-level layer of communication, and provides the generated frame to a signal processing unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like. Further, the data processing unit 11 adds grouping information of the slave device in the multiplexing communication to a generated frame.

As illustrated in FIG. 2, the communication unit 12 includes a signal processing unit 13, a channel estimating unit 14, a wireless interface unit 15, and an amplifying unit 16. Although not illustrated, the communication device 10-1 is provided with a power source such as a fixed power source or a battery.

The signal processing unit 13 performs a modulation process or the like on the frame. Specifically, the signal processing unit 13 generates a symbol stream by performing encoding, interleaving, and modulation on the frame provided from the data processing unit 11 in accordance with a modulation and coding scheme set by the control unit 17. Further, the signal processing unit 13 acquires the frame by performing demodulating, decoding, and the like on the symbol stream obtained by spatial processing, and provides the acquired frame to the data processing unit 11 or the control unit 17.

Further, the signal processing unit 13 performs a process involved in space-division multiplex communication. Specifically, the signal processing unit 13 performs a signal process involved in space separation, on a symbol stream generated, and provides symbol streams obtained by the process to the respective wireless interface units 15. The signal processing unit 13 also performs a spatial process, such as a symbol stream separation process or the like, on symbol streams obtained from the wireless interface units 15.

The channel estimating unit 14 estimates a channel gain. Specifically, the channel estimating unit 14 calculates complex channel gain information from a preamble part or training signal part of a signal contained in the symbol stream obtained from the wireless interface unit 15. Note that the calculated complex channel gain information is provided to the signal processing unit 13 through the control unit 17, and is used in a modulation process and a space separation process or the like.

The wireless interface unit 15 generates a signal to be transmitted and received via an antenna. Specifically, the wireless interface unit 15 converts the signal related to the symbol stream provided from the signal processing unit 13 into an analog signal, and performs filtering and frequency up-conversion on the analog signal. Then, the wireless interface unit 15 provides the obtained signal to the amplifying unit 16. Further, the wireless interface unit 15 carries out a process opposite to that in the case of signal transmission, for example, frequency down-conversion, digital signal conversion, or the like on the signal obtained from the amplifying unit 16, and provides the signal obtained by the process to the channel estimating unit 14 and the signal processing unit 13. A plurality of wireless interface units 15 need not necessarily be arranged.

The amplifying unit 16 amplifies the signal. Specifically, the amplifying unit 16 amplifies the analog signal provided from the wireless interface unit 15 up to a predetermined power and transmits the signal obtained by the amplification via the antenna. Further, the amplifying unit 16 amplifies a signal related to a radio wave received via the antenna up to a predetermined power, and provides the signal obtained by the amplification to the wireless interface unit 15. For example, the amplifying unit 16 may be a power amplifier module or the like. Either or both of a transmission radio wave amplification function and a reception radio wave amplification function of the amplifying unit 16 may be included in the wireless interface unit 15.

Hereinafter, the signal processing unit 13, the channel estimating unit 14, the wireless interface unit 15, and the amplifying unit 16 are referred to collectively as a "communication unit 12."

The control unit 17 controls the operation of the communication device 10-1 in general. Specifically, the control unit 17 performs processes such as transfer of information between functions, a setting of communication parameters, and scheduling of frames (or packets) in the data processing unit 11.

((Functions when Operating as Base Station))

Next, functions of the communication device 10-1 operating as a base station will be described in detail.

(Channel Information Acquisition Process)

Figure 3:
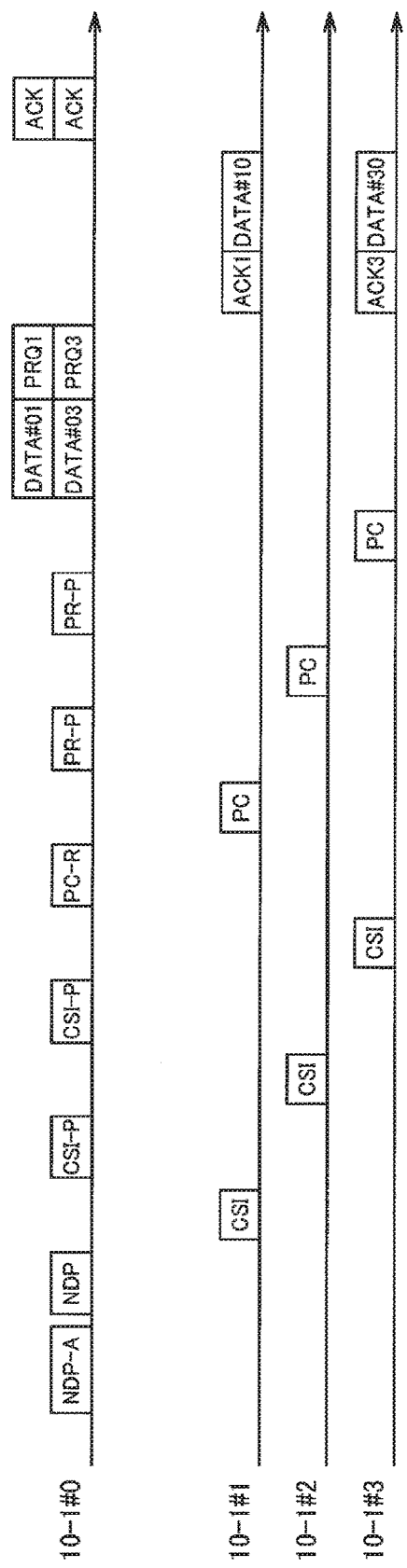
FIG. 3 is a diagram illustrating an example of a frame exchange sequence in the present embodiment.

The control unit 17 acquires channel information in communication between the base station and the slave device. Specifically, the control unit 17 requests the slave device to transmit channel information serving as propagation path information via communication, and acquires the channel information from the slave device. More specifically, the control unit 17 causes the data processing unit 11 to generate a frame related to the request for the channel information (hereinafter also referred to as "channel information request"), and causes the communication unit 12 to transmit the generated channel information request. Further, the control unit 17 acquires the channel information received as a response to the channel information request from the slave device from the data processing unit 11. Further, the process of acquiring the channel information will be described in detail with reference to FIG. 3. FIG. 3 is a diagram illustrating an example of a frame exchange sequence in the present embodiment.

First, the base station transmits the channel information request to each of the slave devices. For example, as illustrated in FIG. 3, a base station 10-1#0 transmits a null data packet (NDP) frame to each of slave devices 10-1#1 to 10 #4. The request for the channel information may be made through a frame indicating the request for the channel information instead of the NDP frame or the like.

Then, the base station receives the channel information from each of the slave devices as the response to the channel information request. For example, each of the slave devices 10-1#1 to 10-1#4 measures a channel when the NDP frame is received. Then, as illustrated in FIG. 3, the base station 10-1#0 first receives a channel state information (CSI) frame including the channel information obtained by the measurement from the slave device 10-1#1 after an NDP announcement (NDP-A) frame is transmitted. Thereafter, the base station 10-1#0 sequentially transmits a CSI-Poll (CSI-P) frame to the remaining slave devices 10-1#2 and 10-1#3, and receives the CSI frames from the slave devices 10-1#2 and 10-1#3.

The data processing unit 11 generates a frame destined for the slave device on the basis of an instruction given from the control unit 17. Specifically, the data processing unit 11 generates the channel information request on the basis of an instruction given from the control unit 17, and provides the generated channel information request to the communication unit 12.

The data processing unit 11 also extracts data from the frame transmitted from the slave device. Specifically, when a frame including the channel information (hereinafter also referred to as a "channel information notification") is received by the communication unit 12, the data processing unit 11 acquires the channel information from the frame and provides the acquired channel information to the control unit 17.

The communication unit 12 performs a frame transmission/reception process. Specifically, the communication unit 12 transmits the channel information request provided from the data processing unit 11 to the slave device. Further, the communication unit 12 receives the channel information notification received from the slave device.

(Transmission Power Information Acquisition Process)

The control unit 17 acquires information indicating the range of the transmission power which is settable by the slave device, that is, the transmission output adjustable range (hereinafter also referred to as "transmission power information"). Specifically, the control unit 17 requests the slave device to transmit the transmission power information via communication, and acquires the transmission power information from the slave device. More specifically, the control unit 17 causes the data processing unit 11 to generate a frame indicating a request for the transmission power information (hereinafter also referred to as "transmission power information request"), and causes the communication unit 12 to transmit the generated transmission power information request. Further, the control unit 17 acquires the transmission power information received as a response to the transmission power information request from the slave device from the data processing unit 11. Further, the process of acquiring the transmission power information will be described in detail with reference to FIG. 3.

First, the base station transmits the transmission power information request to each of the slave devices. For example, as illustrated in FIG. 3, the base station 10-1#0 transmits a power class request (PC-R) frame to each of the slave devices 10-1#1 to 10-1#4.

Then, the base station receives the transmission power information from each of the slave devices as the response to the transmission power information request. For example, as illustrated in FIG. 3, the base station 10-1#0 first receives a power class (PC) frame including the transmission power information from the slave device 10-1#1. Thereafter, the base station 10-1#0 sequentially transmits a power class report poll (PR-P) frame to the remaining slave devices 10-1#2 and 10-1#3, and receives the PC frame from the slave devices 10-1#2 and 10-1#3.

As the frame used as the transmission power information request, a beacon frame, an association response frame, a reassociation response frame, a probe response frame, an action frame, or an action no ACK frame defined in IEEE Std 802.11 (TM)-2012 may be used. Further, the frame used as the transmission power information request is not limited to the above examples, and a new frame or an information element which is not defined in IEEE Std 802.11 (TM)-2012, a power constraint element defined in IEEE Std 802.11 (TM)-2012, or the like may be used.

The data processing unit 11 generates the transmission power information request on the basis of an instruction given from the control unit 17 and provides the generated transmission power information request to the communication unit 12. Further, when a frame including the transmission power information (hereinafter also referred to as "transmission power information notification") is received by the communication unit 12, the data processing unit 11 acquires the transmission power information from the transmission power information notification, and provides the acquired transmission power information to the control unit 17.

The communication unit 12 transmits the transmission power information request provided from the data processing unit 11 to the slave device and receives the transmission power information notification received from the slave device.

Figure 4:
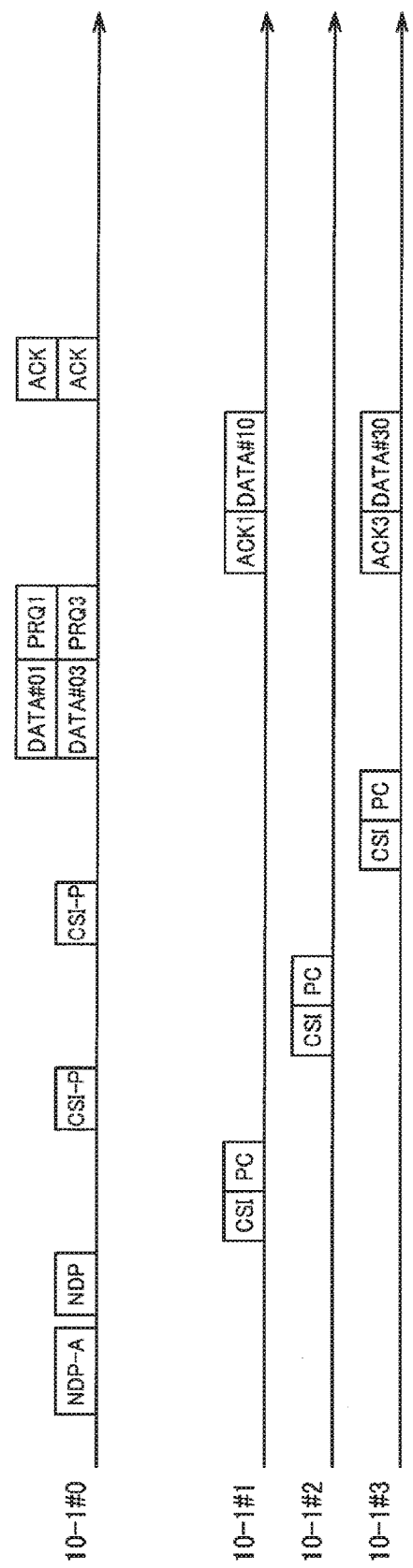
FIG. 4 is a diagram illustrating another example of the frame exchange sequence in the present embodiment.

The example in which the transmission power information is acquired separately from the channel information has been described above, but the transmission power information may be acquired together with the channel information. Specifically, the transmission power information is added to the channel information notification. Further, communication of the channel information and the transmission power information notification will be described with reference to FIG. 4. FIG. 4 is a diagram illustrating another example of the frame exchange sequence in the present embodiment.

First, the base station transmits the channel information request to each of the slave devices. For example, as illustrated in FIG. 4, the base station 10-1#0 transmits an NDP frame to each of the slave devices 10-1#1 to 10-1#4 after transmitting the NDP-A frame.

Then, the base station receives the channel information to which the transmission power information is added as a response to the channel information request from each of the slave devices. For example, each of the slave devices 10-1#1 to 10-1#4 generates a CSI frame including the channel information, and adds a PC frame including the transmission power information to the CSI frame. Then, as illustrated in FIG. 4, the base station 10-1#0 receives a frame in which the PC frame is added to the CSI frame from each of the slave devices 10-1#1 to 10-1#4

(Function of Grouping Slave Devices Related to Transmission Power Control)

The control unit 17 executes grouping of slave devices that perform the multiplexing communication. Specifically, the control unit 17 selects slave devices in which a transmission power is settable so that a reception power density or a reception power value (also referred to collectively as "reception power") falls within a predetermined range from a plurality of slave devices that perform the multiplexing communication. More specifically, the control unit 17 performs selection or grouping of slave devices in which a transmission power which is decided on the basis of the channel information and encouraged to be set in the slave device (hereinafter also referred to as a "request transmission power") falls within the transmission output adjustable range indicated by the transmission power information. A range of the reception power may be decided for each group or may be common to groups.

For example, the control unit 17 divides the slave devices having the base station in which the base station has the channel information and the transmission power information among the connected slave devices into groups configured with a predetermined number of slave devices. The selection of the slave devices may be performed randomly or may be performed using specific conditions.

Then, the control unit 17 decides the request transmission power on the basis of the channel information of each of the slave devices belonging to the group. More specifically, the request transmission power is decided so that the reception power of the radio wave transmitted from the slave device at the request transmission power falls within a predetermined range. The request transmission power may be decided as one value in the group.

Then, the control unit 17 determines whether or not each of the slave devices belonging to group is able to set the decided request transmission power. More specifically, the control unit 17 determines whether or not the decided request transmission power is within the transmission output adjustable range indicated by the transmission power information of each of the slave devices belonging to the group.

Then, when each of the slave devices belonging to group is determined to be able to set the decided request transmission power, the grouping process ends. When it is determined to be difficult for any one of the slave devices belonging to the group to set the decided request transmission power, the control unit 17 returns to the grouping process and repeats the process.

(Function of Requesting Slave Device to Perform Transmission Power Control)

The control unit 17 causes the data processing unit 11 to generate a frame including information indicating the decided request transmission power (hereinafter also referred to as a "transmission power setting request"), and causes the communication unit 12 to transmit the generated transmission power setting request to the slave device. For example, the request transmission power indicated in the transmission power setting request may be a value of requesting an increase or a decrease in the transmission power, information specifying the requested value, or a value of the transmission power to be set.

The data processing unit 11 generates the transmission power setting request on the basis of an instruction given from the control unit 17 and provides the generated transmission power setting request to the communication unit 12. Further, the communication unit 12 transmits the transmission power setting request provided from the data processing unit 11 to the slave device. For example, the data processing unit 11 generates the transmission power setting request destined for the slave devices 10-1#1 and 10-1#3 belonging to a decided certain group. For example, the data processing unit 11 generates a transmission power setting request including information PRQ1 indicating the request transmission power for the slave device 10-1#1 and a data portion DATA#01 illustrated in FIG. 3. Then, the communication unit 12 transmits the generated transmission power setting request to each of the slave stations 10-1#1 and 10-1#3. The transmission power setting request is transmitted using a multiplexed frame but may be transmitted using a multicast frame, an aggregation frame, or the like.

((Function when Operating as Slave Device))

Next, functions of the communication device 10-1 operating as the slave device will be described in detail.

(Information Provision Function)

The control unit 17 responds to the request transmitted from the base station. Specifically, when the channel information is requested from the base station, the control unit 17 causes the data processing unit 11 to generate the channel information notification and causes the communication unit 12 to transmit the generated frame to the base station. Further, when the transmission power information request is received from the base station, the control unit 17 causes the data processing unit 11 to generate the transmission power information notification and causes the communication unit 12 to transmit the generated frame to the base station.

The data processing unit 11 generates a frame destined for the base station on the basis of an instruction given from the control unit 17. Specifically, the data processing unit 11 generates the channel information notification and the transmission power information notification. Then, the data processing unit 11 provides the generated frame to the communication unit 12. Further, the transmission power information notification to be generated will be described in detail with reference to FIG. 5. FIG. 5 is a diagram illustrating an example of a configuration of the transmission power information notification transmitted by the slave device according to the present embodiment.

As illustrated in FIG. 5, the transmission power information notification includes fields such as Element Identifier (ID), Length, minimum transmission power, and maximum transmission power. A minimum transmission power value and a maximum transmission power value of its own device are stored in the fields "minimum transmission power" and "maximum transmission power." The frame may be a frame according to a format defined in IEEE Std 802.11 (TM)-2012.

The frame used as the transmission power information notification may be an association request frame, a reassociation request frame, an action frame, or an action no ACK frame which is defined in IEEE Std 802.11 (TM)-2012. The frame used as the transmission power information notification is not limited to the above examples and may be a new frame or an information element which is not defined in IEEE Std 802.11 (TM)-2012, a power constraint element defined in IEEE Std 802.11 (TM)-2012, or the like.

The communication unit 12 performs a frame transmission/reception process. Specifically, the communication unit 12 transmits the channel information notification and the transmission power information notification generated by the data processing unit 11 to the base station. Further, the communication unit 12 receives the frame related to the request for the channel information and the transmission power setting request from the base station.

Further, the communication unit 12 generates the channel information. Specifically, the communication unit 12 measures the channel when the request for the channel information is received from the base station. For example, when the NDP frame is received from the base station, the communication unit 12 measures the channel using a preamble of the NDP frame.

(Transmission Power Control Function)

The control unit 17 performs the transmission power control (hereinafter also referred to as "transmit power control (TPC)") in the slave device. Specifically, the control unit 17 gives an instruction to perform a setting of the transmission power based on the transmission power setting request received from the base station. More specifically, when the transmission power setting request is received from the base station, the control unit 17 causes the communication unit 12, that is, the amplifying unit 16 to set the transmission power indicated by the transmission power setting request as the transmission power of its own device. The control unit 17 may calculate the transmission power value on the basis of the transmission power setting request.

For example, when the transmission power setting request is received from the base station, the control unit 17 instructs the data processing unit 11 and the communication unit 12 to generate and transmit a frame serving as a response to the transmission power setting request. The data processing unit 11 generates a frame including an acknowledgment response ACK to the transmission power setting request and a data portion DATA#10 illustrated in FIG. 3, and provides the generated frame to the communication unit 12. Then, the communication unit 12 transmits the frame provided from the data processing unit 11 to the base station at the transmission power set as will described later. As illustrated in FIG. 3, the acknowledgment response to the frame, that is, the ACK frame is received from the base station.

Further, when the TPC is not performed, the control unit 17 may not give an instruction to perform the setting of the transmission power to the amplifying unit 16 or may give an instruction to set a predetermined value (hereinafter also referred to as a "default value"), for example, a transmission power value generally used in a wireless LAN communication to the amplifying unit 16.

The communication unit 12 amplifies the transmission signal on the basis of an instruction given from the control unit 17. Specifically, when the instruction to perform the setting of the transmission power is given from the control unit 17, the amplifying unit 16 sets the transmission power of its own device to be the transmission power according to the instruction. The amplifying unit 16 sets the transmission power to the default value when the transmission power value is not instructed from the control unit 17 or when the setting of the default value is instructed. Then, the amplifying unit 16 amplifies the signal provided from the wireless interface unit 15 up to the set transmission power.

2-2. Process of Device

Next, processes of the base station and the slave device according to the present embodiment will be described.
(Process of Base Station)

First, an overview of a process of the base station will be described with reference to FIG. 6. FIG. 6 is a flowchart conceptually illustrating the overview of the process of the base station according to the present embodiment.

The base station determines the presence or absence of the channel information of the connected slave device (step S101). Specifically, the control unit 17 determines whether or not the channel information has already been acquired from each of the connected slave devices.

When the base station is determined not to hold the channel information of the slave devices, the base station requests the slave devices to transmit the channel information (step S102). Specifically, when there are slave devices whose channel information has not been acquired, the control unit 17 causes the communication unit 12 to transmit the channel information request to each of the connected slave devices. The request for the channel information may be transmitted only to the slave devices whose channel information has not been acquired yet.

Then, the base station receives the channel information from the slave device (step S103). Specifically, the communication unit 12 receives the channel information notification from each of the slave devices, and the data processing unit 11 acquires the channel information from the channel information notification. Then, the acquired the channel information is provided to the control unit 17.

Then, the base station determines the presence or absence of the transmission power information of the connected slave device (step S104). Specifically, the control unit 17 determines whether or not the transmission power information has already been acquired from each of the connected slave devices.

When the base station is determined not to hold the transmission power information of the slave devices, the base station transmits the transmission power information request to the slave devices (step S105). Specifically, when there are slave devices whose transmission power information has not been acquired, the control unit 17 causes the communication unit 12 to transmit the transmission power information request to each of the connected slave devices. The transmission power information request may be transmitted only to the slave devices whose transmission power information has not been acquired yet.

Then, the base station receives the transmission power information from the slave devices (step S106). Specifically, the communication unit 12 receives the transmission power information notification from each of the slave devices, and the data processing unit 11 acquires the transmission power information from the transmission power notification. Then, the acquired transmission power information is provided to the control unit 17.

Then, the base station executes the grouping of the slave devices and decides the request transmission power (step S107) Specifically, the control unit 17 executes the grouping of the connected slave devices and decides the request transmission power for the slave devices. This will be described later in detail.

Then, the base station transmits the transmission power setting request for each group (step S108). More specifically, for each group decided by the grouping, the control unit 17 causes the data processing unit 11 to generate the transmission power setting request including the information indicating the request transmission power decided in the group for each of the slave devices belonging to the group. Then, the control unit 17 causes the communication unit 12 to transmit the transmission power setting request.

Then, the base station receives multiplexed data from the slave device (step S109). More specifically, the communication unit 12 receives the multiplexed data transmitted at the request transmission power indicated by the transmission power request from the slave device which is a transmission destination of the transmission power setting request.

Figure 7:
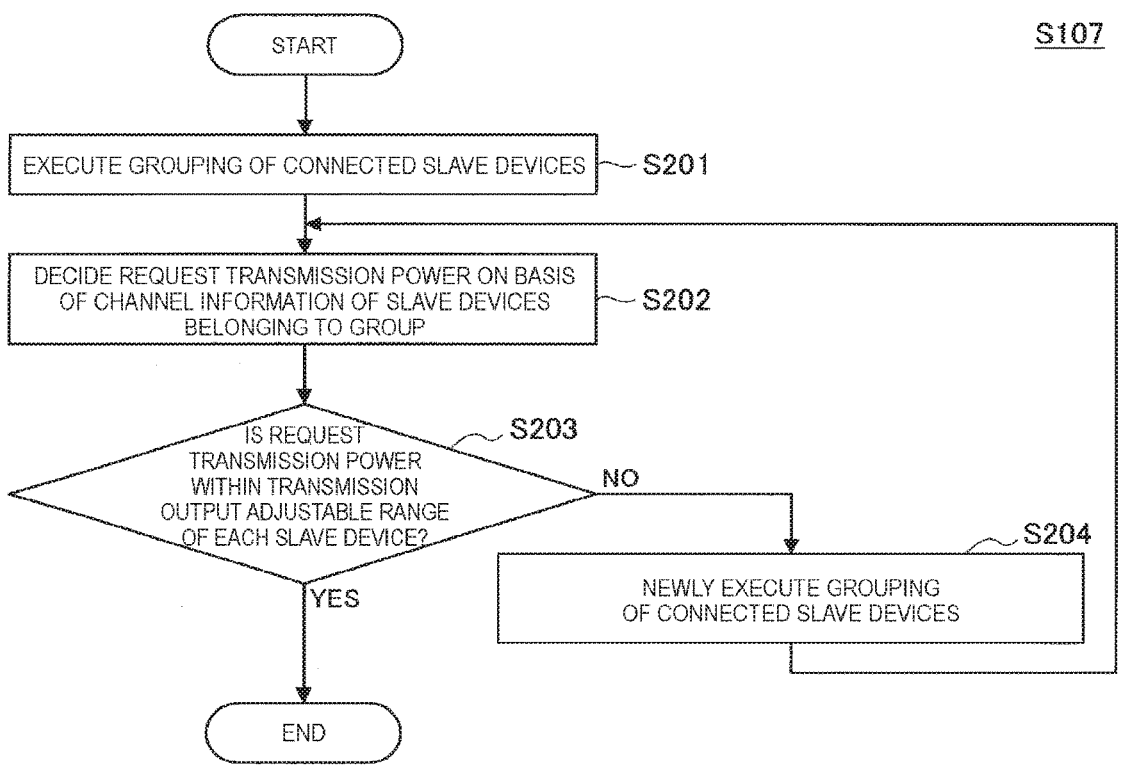
FIG. 7 is a flowchart conceptually illustrating a process of grouping slave devices and deciding a request transmission power in a base station according to the present embodiment.

Next, the process of grouping the slave devices and deciding the request transmission power in the base station will be described with reference to FIG. 7. FIG. 7 is a flowchart conceptually illustrating the process of grouping the slave devices and deciding the request transmission power in the base station according to the present embodiment.

First, the base station executes the grouping of the connected slave devices (step S201). Specifically, the control unit 17 divides a plurality of connected slave devices into groups including a predetermined number of slave devices. The executed grouping is stored in the storage unit as a pattern.

Then, the base station decides the request transmission power on the basis of the channel information of the slave devices belonging to the group for each group (step S202). Specifically, the control unit 17 decides the request transmission power in which the reception power falls within a predetermined range on the basis of the channel information of the slave devices belonging to the group for each group decided by the grouping.

Then, the base station determines whether or not the request transmission power is within the transmission output adjustable range of each slave device (step S203). Specifically, the control unit 17 determines whether or not each of the decided request transmission powers fall within the transmission output adjustable range indicated by the respective transmission power information for all the slave devices belonging to the group.

When the request transmission power is determined not to be within the transmission output adjustable range of each slave device, the base station newly executes grouping of the connected slave devices (step S204). Specifically, when the request transmission power is determined not to fall within the transmission output adjustable range for any one of the slave devices belonging to the group, the control unit 17 executes grouping different from the grouping pattern stored in the storage unit. Then, the process returns to step S202. Similarly to the process of step S201, the executed grouping is stored in the storage unit as a pattern. Further, when there is no unexecuted grouping pattern, the control unit 17 groups each of the slave devices into groups including only a single slave device, and decides the request transmission power on the basis of the channel information for each of the slave devices.

Further, when the request transmission power is determined to fall within the transmission output adjustable range of each slave device in step S203, the base station ends the grouping process.

(Process of Slave Device)

Figure 8:
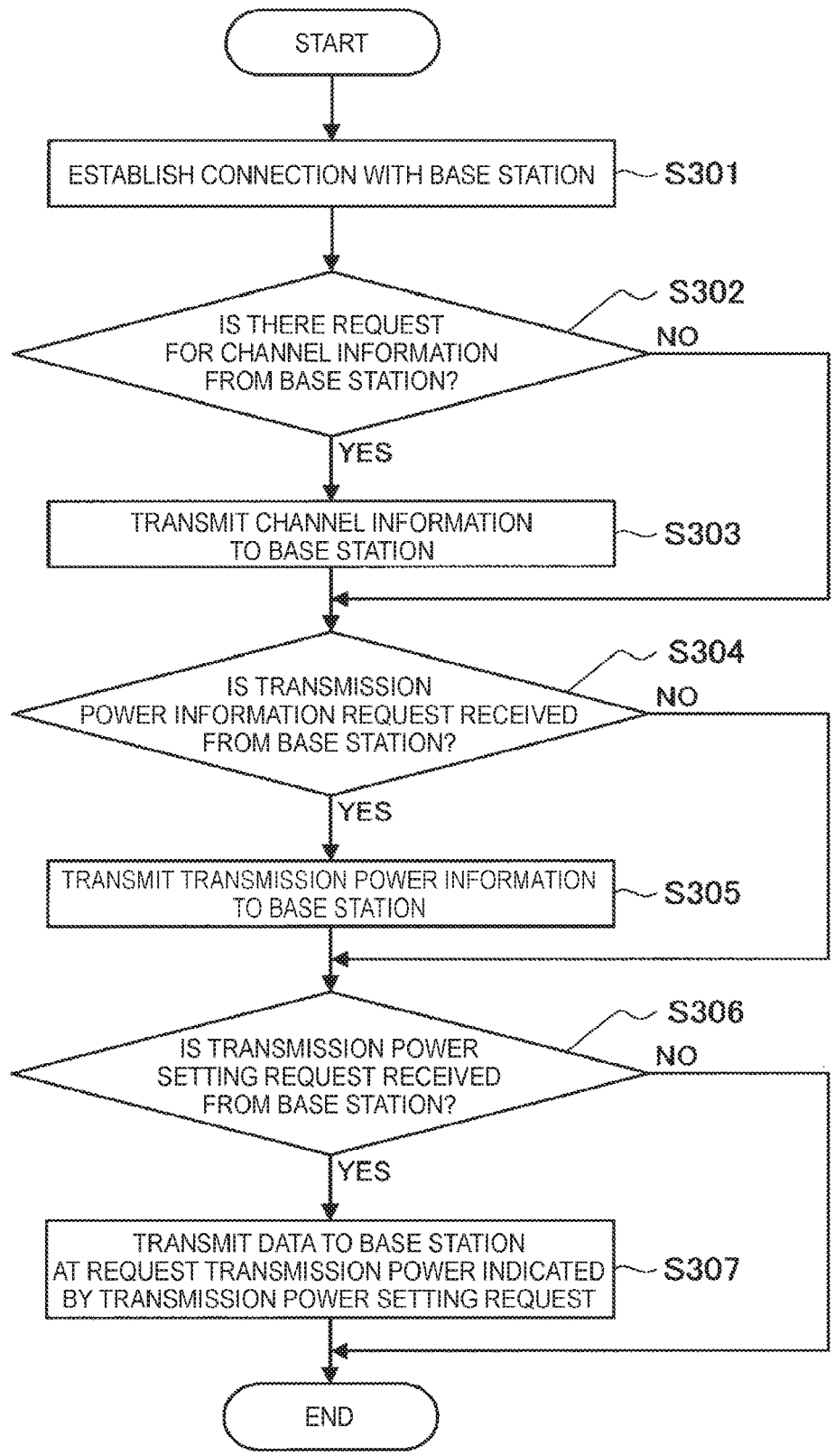
FIG. 8 is a flowchart conceptually illustrating a process of a slave device according to the present embodiment.

Then, a process of the slave device will be described with reference to FIG. 8. FIG. 8 is a flowchart conceptually illustrating the process of the slave device according to the present embodiment.

First, the slave device establishes a connection with the base station (step S301). Specifically, the communication unit 12 establishes a communication connection with the base station. The slave device holds data to be transmitted to the base station.

Then, the slave device determines whether or not the channel information is requested from the base station (step S302). Specifically, when a frame is received from the base station, the data processing unit 11 determines whether or not the frame is a transmission notice of the channel information request. When the received frame is the transmission notice, the communication unit 12 measures the channel using a frame which is received next, that is, the channel information request, and provides the measured channel information to the control unit 17. The channel measurement may be performed using a radio wave received before the channel information request is received.

When the channel information is determined to be requested from the base station, the slave device transmits the channel information to the base station (step S303). Specifically, when the received frame is determined to be the channel information request, the control unit 17 causes the data processing unit 11 to generate the acquired channel information notification, and causes the communication unit 12 to transmit the generated channel information notification to the base station.

Then, the slave device determines whether or not the transmission power information request is received from the base station (step S304). Specifically, when a frame is received from the base station, the data processing unit 11 determines whether or not the frame is the transmission power information request.

When the transmission power information request is determined to be received from the base station, the slave device transmits the transmission power information to the base station (step S305). Specifically, when the received frame is determined to be the transmission power information request, the control unit 17 causes the data processing unit 11 to generate the transmission power information notification of its own device, and causes the communication unit 12 to transmit the generated transmission power information notification to the base station.

Then, the slave device determines whether or not the transmission power setting request is received from the base station (step S306). Specifically, when a frame is received from the base station, the data processing unit 11 determines whether or not the frame is the transmission power setting request.

When the transmission power setting request is determined to be received from the base station, the slave device transmits data to the base station at the request transmission power indicated by the transmission power setting request (step S307). Specifically, when the received frame is determined to be the transmission power setting request, the control unit 17 causes the communication unit 12, that is, the amplifying unit 16 to set the transmission power of its own device to the request transmission power indicated by the transmission power setting request. Then, the control unit 17 causes the data processing unit 11 to generate a data frame, and causes the communication unit 12 to transmit the generated data frame to the base station at the request transmission power.

As described above, according to the first embodiment of the present disclosure, the communication device 10-1 operating as the base station can select the slave devices in which the transmission power is settable so that the reception power falls within a predetermined range from a plurality of slave devices performing the multiplexing communication, and transmits the transmission power setting request indicating the transmission power to each of the selected slave devices. The communication device 10-1 operating as the slave device transmits the transmission power information indicating the range of the settable transmission power, receives the transmission power setting request indicating the transmission power settable by its own device, and sets the transmission power indicated by the received transmission power setting request to the transmission power of its own device. Then, the slave device performs the multiplexing communication at the set transmission power. Therefore, when the transmission of the slave device which is given the notification of the transmission power outside the transmission output adjustable range is not suppressed, the densities of the reception signals received from the slave devices performing the multiplexing communication become uniform, and thus it is possible to suppress the deterioration in the reception characteristic and suppress the increase in the communication error. Further, when the transmission of the slave device which is given the notification of the transmission power outside the transmission output adjustable range is suppressed, the reduction in the transmission opportunity of each of the slave devices is suppressed, and thus it is possible to control the transmission power while maintaining the communication efficiency.

Further, the base station receives the transmission power information indicating the transmission power range which is settable by each of a plurality of slave devices, and selects the slave devices in which the transmission power indicated by the transmission power setting request generated on the basis of the channel information in communication with a plurality of slave devices falls within the transmission power range indicated by the received transmission power information. Further, the slave device generates the frame including the transmission power information, and transmits the generated frame when the transmission power information is requested. Therefore, since the request transmission power is decided on the basis of the information acquired directly from each of the slave devices, it is possible to reliably prevent the request transmission power from being decided outside the transmission output adjustable range and further improve the communication efficiency.

Further, the base station generates the frame including the information indicating the request transmission power, and transmits the generated frame. Therefore, since the request transmission power is transmitted through the frame, it is possible to use an existing wireless communication process for acquisition of the request transmission power and to secure versatility.

2-3. Modified Examples

The first embodiment of the present disclosure has been described above. The present embodiment is not limited to the above example. First and second modified examples of the present embodiment will be described below.

First Modified Example

As the first modified example of the present embodiment, the transmission power information may be extended in connection with information of changing the transmission power. Specifically, the transmission power information is information indicating the transmission output adjustable range corresponding to a frequency bandwidth (hereinafter also referred to as a "bandwidth") used by each of a plurality of slave devices. The transmission power information of the present modified example will be described in detail with reference to FIG. 9. FIG. 9 is a diagram illustrating a configuration example of the transmission power information notification in the first modified example of the present embodiment.

As illustrated in FIG. 9, the transmission power information notification includes fields such as Element ID, Length, and minimum transmission power and maximum transmission power of each bandwidth. For example, a minimum transmission power value when a certain bandwidth is used is stored in a field "bandwidth 1" related to the minimum transmission power as illustrated in FIG. 9, and a maximum transmission power value when the certain bandwidth is used is stored in a field "bandwidth 1" related to the maximum transmission power. Further, a set of minimum and maximum transmission powers of each bandwidth may be connected after "Length."

Further, the transmission power information may be a transmission output adjustable range corresponding to information indicating a modulation scheme and a coding scheme instead of the transmission output adjustable range corresponding to a frequency bandwidth. Specifically, the transmission power information is a transmission output adjustable range corresponding to a modulation and coding scheme (MCS). An example in which the transmission power information is information related to the MCS will be described in detail with reference to FIG. 10. FIG. 10 is a diagram illustrating another configuration example of the transmission power information notification in the present modified example.

As illustrated in FIG. 10, the transmission power information notification includes fields such as Element ID, Length, and minimum transmission power and maximum transmission power of each MCS. For example, a minimum transmission power value when a certain MCS is used is stored in a field "MCS 1" related to the minimum transmission power illustrated in FIG. 10, and a maximum transmission power value when the certain MCS is used is stored in a field "MCS 1" related to the maximum transmission power. Further, a set of minimum and maximum transmission powers of each MCS may be connected after "Length."

Further, the transmission power information may be a transmission output adjustable range corresponding to information indicating a channel identifier, instead of the transmission output adjustable range corresponding to the frequency bandwidth. Specifically, the transmission power information is a transmission output adjustable range corresponding to information indicating a frequency (frequency component) used for communication. An example in which the transmission power information is the channel identifier, that is, information related to a frequency will be described in detail with reference to FIG. 11. FIG. 11 is a diagram illustrating another configuration example of the transmission power information notification in the present modified example.

As illustrated in FIG. 11, the transmission power information notification includes fields such as Element ID, Length, and minimum transmission power and maximum transmission power of each frequency. For example, a minimum transmission power value when a certain frequency is used is stored in a field "frequency 1" related to the minimum transmission power illustrated in FIG. 11, and a maximum transmission power value when the certain frequency is used is stored in a field "frequency 1" related to the maximum transmission power. Further, a set of minimum and maximum transmission powers of each frequency may be connected after "Length."

Figure 12:
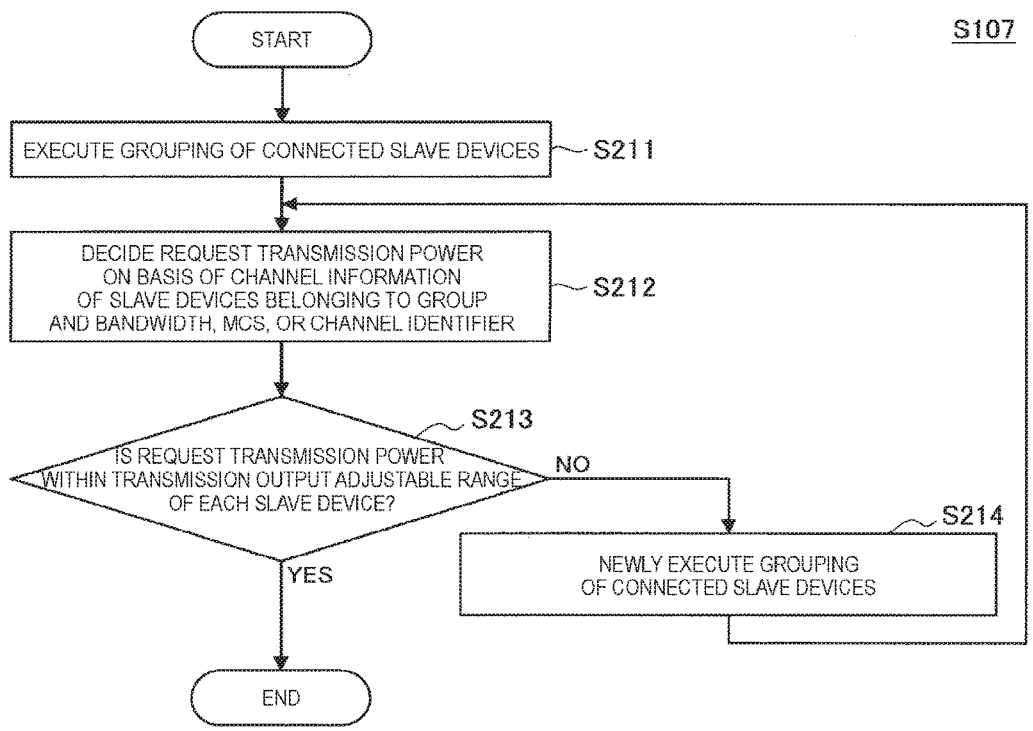
FIG. 12 is a flowchart conceptually illustrating a process of grouping slave devices and deciding a request transmission power in a base station according to the first modified example of the present embodiment.

Further, a process of grouping the slave devices and deciding the request transmission power in the base station according to the present modified example will be described with reference to FIG. 12. FIG. 12 is a flowchart conceptually illustrating the process of grouping the slave devices and deciding the request transmission power in the base station according to the first modified example of the present embodiment. Further, description of processes that are substantially the same as the processes in the first embodiment will be omitted.

First, the base station executes grouping of the connected slave devices (step S211) and decides the request transmission power for each group on the basis of the channel information and the bandwidth, the MCS or the channel identifier of the slave devices belonging to the group (Step S212). Specifically, the control unit 17 decides the request transmission power in which the reception power falls within a predetermined range for each of the slave devices on the basis of the channel information and the information indicating the bandwidth, the MCS, or the channel identifier used in transmission of the slave devices. For example, the request transmission power is decided such that the transmission power decreases as the bandwidth increases, as a modulation rate in the MCS increases, or as a coding rate in the MCS decreases.

Then, the base station determines whether or not the request transmission power is within the transmission output adjustable range of each slave device (step S213). Specifically, the control unit 17 decides the transmission output adjustable range corresponding to the bandwidth, the MCS, or the channel identifier used in the slave device from the transmission output adjustable range of each bandwidth, each MCS, or each channel identifier included in the transmission power information received from the slave device for each of the slave devices. Then, the control unit 17 determines whether or not each decided request transmission power fall within each transmission output adjustable ranges for all the slave devices belonging to the group.

When the request transmission power is determined not to be within the transmission output adjustable range of each slave device, the base station newly executes grouping of the connected slave devices (step S214). Then, the process returns to step S212.

As described above, according to the first modified example of the present embodiment, the transmission power information is the information indicating the transmission output adjustable range corresponding to the frequency bandwidth, the MCS information, or the channel identifier used by each of a plurality of slave devices. Here, the magnitude of the transmission power is known to change in accordance with a change in at least one of the frequency bandwidth, the MCS information, or the channel identifier. For example, as the frequency bandwidth changes, the maximum transmission power may change. Therefore, when the decision of the request transmission power and the grouping are performed on the basis of the frequency bandwidth, the MCS information, or the channel identifier having influence on the magnitude of the transmission power, the request transmission power which is settable by the slave device is more reliably decided, and thus the communication efficiency can be improved.

Second Modified Example

As the second modified example of the present embodiment, the transmission power information may be extended in connection with information related to traffic to be transmitted. Specifically, the transmission power information is information indicating a transmission output adjustable range corresponding to a priority of traffic of each of a plurality of slave devices. For example, for the priority of the traffic, a higher priority than those of other traffics can be set to a traffic which is higher in urgency, a required quality, or the like than other traffics. Further, the transmission power information of the present modified example will be described in detail with reference to FIG. 13. FIG. 13 is a diagram illustrating a configuration example of the transmission power information notification in the second modified example of the present embodiment.

As illustrated in FIG. 13, the transmission power information notification includes fields such as Element ID, Length, minimum transmission power and maximum transmission power of each traffic priority. For example, a minimum transmission power value corresponding to the traffic of a certain priority is stored in a field "traffic priority 1" related to the minimum transmission power illustrated in FIG. 13, and a maximum transmission power value corresponding to the traffic of the certain priority is stored in a field "traffic priority 1" related to the maximum transmission power. Further, a set of minimum and maximum transmission powers of each traffic priority may be connected after "Length."

Figure 14:
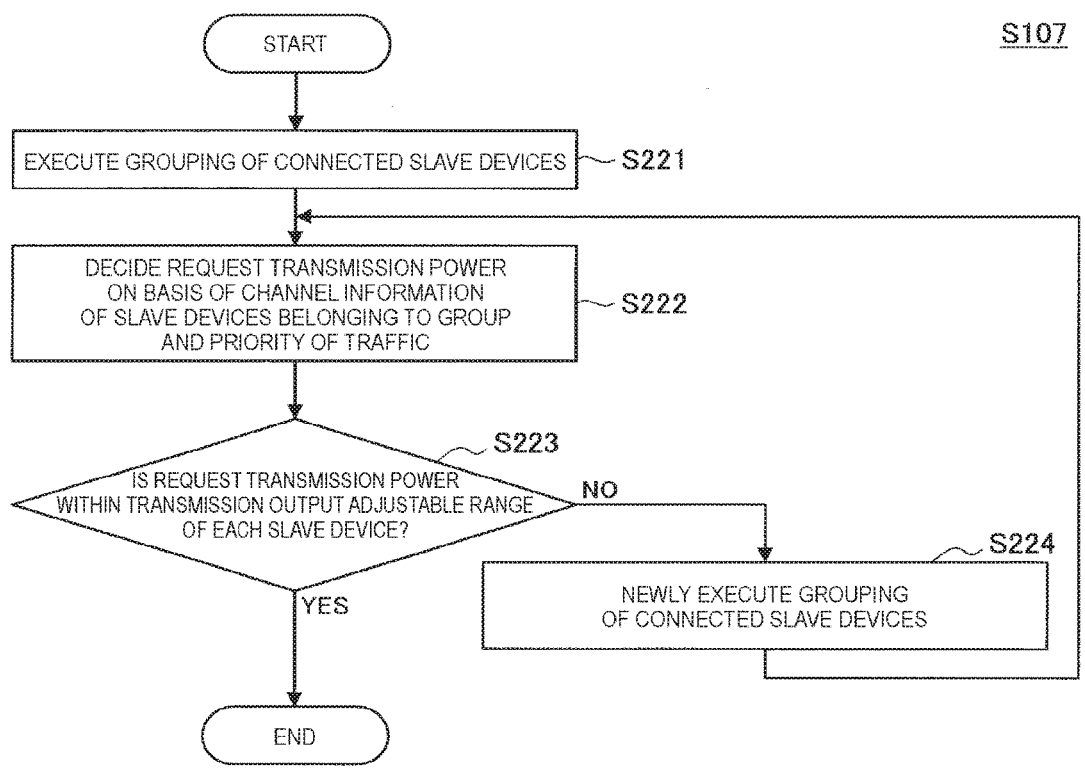
FIG. 14 is a flowchart conceptually illustrating a process of grouping slave devices and deciding a request transmission power in a base station according to the second modified example of the present embodiment.

Further, a process of grouping slave devices and deciding a transmission power in a base station according to the present modified example will be described with reference to FIG. 14. FIG. 14 is a flowchart conceptually illustrating the process of grouping the slave devices and deciding the request transmission power in the base station according to the second modified example of the present embodiment. Further, description of processes that are substantially the same as the processes in the first embodiment will be omitted.

First, the base station executes grouping of the connected slave devices (step S221), and decides the request transmission power for each group on the basis of the channel information and the priority of the traffic of the slave devices belonging to the group (step S222). Specifically, the control unit 17 decides the request transmission power in which the reception power falls within a predetermined range for each of the slave devices on the basis of the channel information and the information indicating the priority of the traffic transmitted from the slave device. For example, when the priority of the traffic is higher than other traffics, the request transmission power is decided to be higher than when transmission related to other traffics is performed.

Then, the base station determines whether or not the request transmission power is within the transmission output adjustable range of each slave device (step S223). Specifically, the control unit 17 decides the transmission output adjustable range corresponding to the priority of the traffic related to transmission of the slave device from the transmission output adjustable range of each priority of traffic included in the transmission power information received from the slave device for each of the slave devices. Then, the control unit 17 determines whether or not each decided request transmission power fall within each transmission output adjustable ranges for all the slave devices belonging to the group.

When the request transmission power is determined not to be within the transmission output adjustable range of each slave device, the base station newly executes grouping of the connected slave devices (step S224). Then, the process returns to step S222.

As described above, according to the second modified example of the present embodiment, the transmission power information is the information indicating the transmission output adjustable range corresponding to the priority of the traffic of each of a plurality of slave devices. Thus, when the transmission power of a radio wave related to a traffic having a higher priority than other traffics is set to be higher than the transmission power of the radio waves related to other traffics, it is possible to improve a reception success rate of a radio wave related to a traffic having a high priority while maintaining the communication efficiency.

3. SECOND EMBODIMENT (GROUPING BASED ON OTHER INFORMATION RELATED TO TRANSMISSION POWER)

The communication device 10-1 according to the first embodiment of the present disclosure has been described above. Next, the communication device 10-2 according to a second embodiment of the present disclosure will be described.

3-1. Configuration of Device

A functional configuration of the communication device 10-2 is substantially the same as the functional configuration according to the first embodiment, but some functions of the base station and the slave device are different. Further, descriptions of functions that are substantially the same as those of the first embodiment will be omitted.

((Functions when Operating as Base Station))

First, functions of the communication device 10-2 operating as the base station will be described in detail.

(Function of Grouping Slave Devices Related to Transmission Power Control)

The control unit 17 decides the request transmission power on the basis of the information which varies in accordance with the channel information and the magnitude of the transmission power. Specifically, the control unit 17 decides the request transmission power so that power consumption corresponding to the transmission power of the slave device when the transmission power is set to the request transmission power decided on the basis of the channel information is a threshold value or less for each of the slave devices.

For example, the control unit 17 decides the request transmission power for each group on the basis of the channel information of each of the slave devices belonging to the group.

Then, the control unit 17 determines whether or not the power consumption for the transmission power of the slave device when the transmission power is set to the decided request transmission power is a threshold value or less for each of the slave devices. For example, information indicating the power consumption corresponding to the transmission power (hereinafter also referred to as "power consumption information") is added to the transmission power information received from the slave device. Then, the control unit 17 acquires a power consumption amount corresponding to the decided request transmission power from the power consumption information, and determines whether or not the acquired power consumption amount is a threshold value or less.

When the power consumption for the transmission power of the slave device when the transmission power is set to the request transmission power is determined to be a threshold value or less, the control unit 17 determines whether or not the request transmission power is settable in each of the slave devices.

Then, when the decided request transmission power is determined to be settable in each of the slave devices belonging to the group, the control unit 17 ends the grouping process.

((Function when Operating as Slave Device))

Next, functions of the communication device 10-1 operating as the slave device will be described in detail.

(Information Provision Function)

The data processing unit 11 generates the transmission power information notification to which the power consumption information indicating the power consumption corresponding to the transmission power is added. Specifically, when an instruction to generate the transmission power information notification is given from the control unit 17, the data processing unit 11 acquires the power consumption information and generates the transmission power information notification to which the acquired power consumption information is added. The power consumption information may be stored in a storage unit or the like in advance or may be decided by the control unit 17. Further, the transmission power information notification to which the power consumption information is added will be described in detail with reference to FIG. 15. FIG. 15 is a diagram illustrating a configuration example of the transmission power information notification to which the power consumption information transmitted by the slave device according to the present embodiment is added.

As illustrated in FIG. 15, the transmission power information notification to which the power consumption information is added includes fields such as a set of Element ID, Length, minimum transmission power, maximum transmission power, transmission power, and power consumption. For example, the power consumption amount when the field "transmission power 1" is set in the slave device may be stored in a field "power consumption 1."

The example in which the power consumption information indicates the power consumption amount corresponding to the transmission power has been described above, but the power consumption information may be a calculation formula that can calculate the power consumption amount from the transmission power. The transmission power information notification to which power consumption information indicating a calculation formula will be described in detail with reference to FIG. 16. FIG. 16 is a diagram illustrating a configuration example of the transmission power information notification to which another form of power consumption information transmitted by the slave device according to the present embodiment is added.

As illustrated in FIG. 16, the transmission power information notification to which the power consumption information indicating the calculation formula is added includes fields such as Element ID, Length, minimum transmission power, maximum transmission power, and an order and coefficients in the calculation formula. Further, when an order is known in the base station, the field "order" illustrated in FIG. 16 may be omitted.

The power consumption amount indicated by the power consumption information or a value calculated from the calculation formula may be not only a value directly indicating a power consumption but also a value indirectly indicating the degree of power consumption.

3-2. Process of Device (Process of Base Station)

Figure 17:
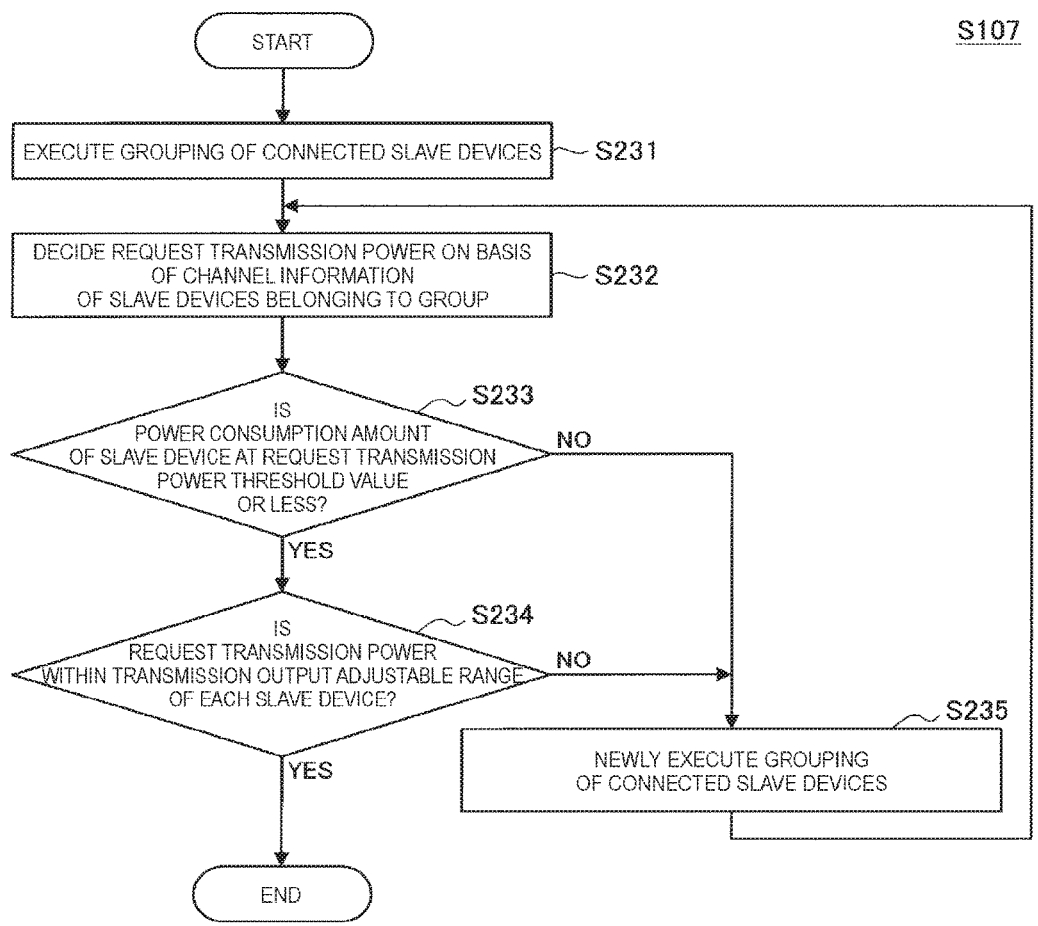
FIG. 17 is a flowchart conceptually illustrating a process of grouping slave devices and deciding a request transmission power in a base station according to the present embodiment.

Then, a process of grouping the slave devices and deciding the request transmission power in the base station according to the present embodiment will be described with reference to FIG. 17. FIG. 17 is a flowchart conceptually illustrating the process of grouping the slave devices and deciding the request transmission power in the base station according to the present embodiment. Further, description of processes that are substantially the same as the processes in the first embodiment will be omitted. A process of the slave device is substantially the same as the process in the first embodiment except that content of the frame to be transmitted is different, and thus description thereof is omitted.

First, the base station executes grouping of the connected slave devices (step S231) and decides the request transmission power for each group on the basis of the channel information of the slave devices belonging to the group (step S232).

Then, the base station determines whether or not the power consumption amount of the slave device at the request transmission power is a threshold value or less (step S233). Specifically, the control unit 17 acquires the power consumption amount corresponding to the decided request transmission power from the power consumption information included in the received transmission power information notification for each of the slave devices. Instead of the above example, the control unit 17 calculates the power consumption amount by applying the decided request transmission power to the calculation formula indicated by the power consumption information of the slave device for each of the slave devices. Then, the control unit 17 determines whether or not the power consumption amount is a threshold value or less.

When the power consumption amount of the slave device at the request transmission power is determined to be a threshold value or less, the base station determines whether or not the request transmission power is within the transmission output adjustable range of each slave device (step S234). Then, when it is determined in step S233 that the power consumption amount of the slave device at the request transmission power exceeds the threshold value or that the request transmission power is not within the transmission output adjustable range of each slave device, grouping is newly performed on the connected slave devices (step S235). Then, the process returns to step S232.

Thus, according to the second embodiment of the present disclosure, the base station decides the transmission power indicated by the transmission power setting request, that is, the request transmission power on the basis of the information that varies in accordance with the channel information and the magnitude of the transmission power. Thus, since the request transmission power is decided while considering influence on the slave device when the transmission power is set to the request transmission power, and thus it is possible to suppress the influence on the slave device when the transmission power is designated while maintaining the communication efficiency.

Further, the information that changes in accordance with the magnitude of the transmission power includes information indicating the power consumption corresponding to the transmission power. Thus, it is possible to reduce the power consumption of the slave device while maintaining the communication efficiency. The information that changes in accordance with the magnitude of the transmission power may be information indicating the power efficiency or transmission signal characteristic for a transmission signal to be described later.

Further, the frame including the transmission power information generated by the slave device includes other information related to the transmission power different from the transmission power information. Thus, since the information for deciding the request transmission power such as the power consumption information is added to the existing transmission power information notification, it is possible to control additional request transmission power without increasing the number of communications.

3-3. Modified Examples

The second embodiment of the present disclosure has been described above. The present embodiment is not limited to the above example. First and second modified examples of the present embodiment will be described below.

First Modified Example

As the first modified example of the present embodiment, the base station decides the request transmission power so that the transmission power improves the performance of the slave device. Specifically, the control unit 17 decides the request transmission power on the basis of information indicating the transmission power at which the performance of each of a plurality of slave devices is improved to be higher than when the channel information and other transmission power are set. More specifically, the transmission power at which the performance of the slave device is improved is transmission power at which the power efficiency for the transmission signal is improved. For example, the power efficiency for the transmission signal may be power added efficiency (PAE) in the amplifying unit 16 such as a power amplifier. Further, the information indicating the transmission power at which the performance of the slave device is improved is added to the transmission power information notification. Further, a transmission power information notification including information indicating the transmission power related to the power efficiency in the present modified example will be described in detail referring to FIG. 18. FIG. 18 is a diagram illustrating a configuration example of the transmission power information notification in the first modified example of the present embodiment.

As illustrated in FIG. 18, the transmission power information notification includes fields such as Element ID, Length, minimum transmission power, maximum transmission power, and high-efficiency transmission power. For example, a transmission power value at which the power efficiency of the slave device is higher than when it is set to other transmission power is stored in a field "high-efficiency transmission power" illustrated in FIG. 18.

Figure 19:
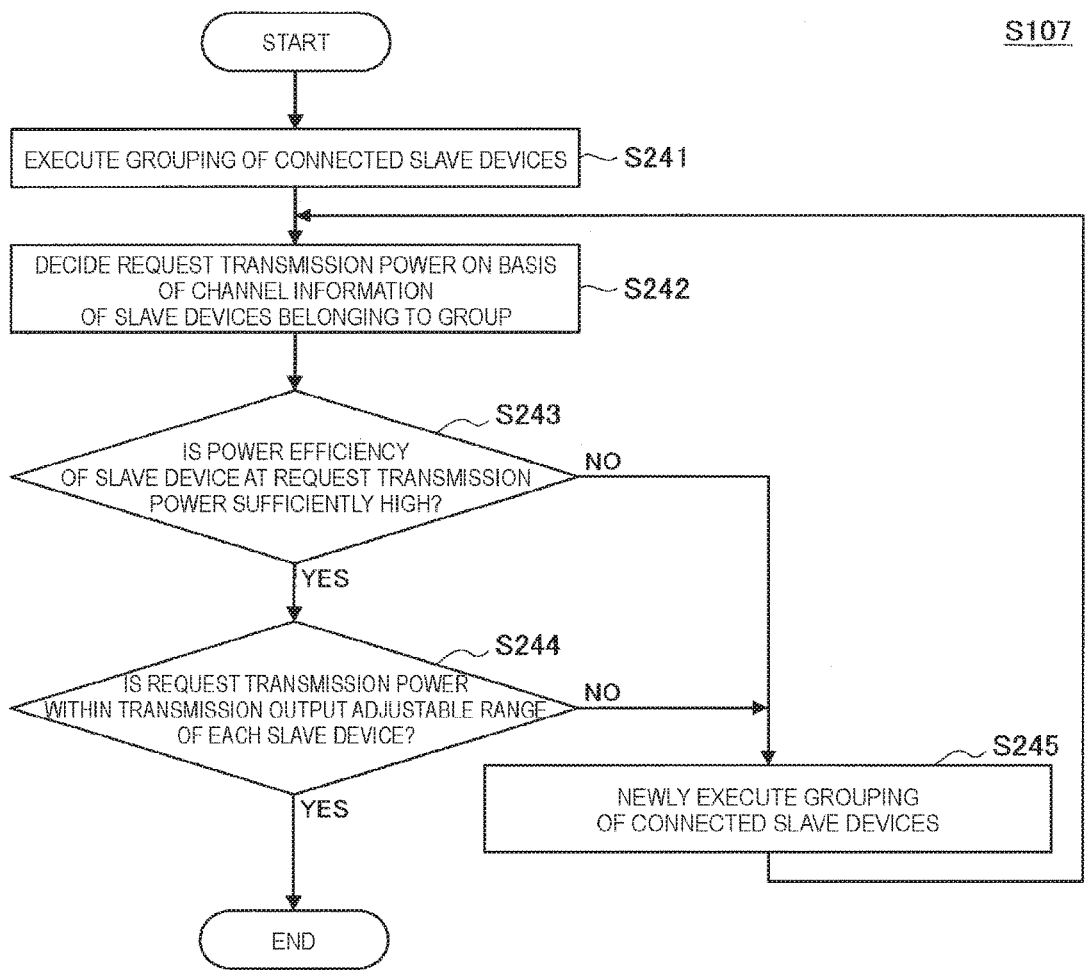
FIG. 19 is a flowchart conceptually illustrating a process of grouping slave devices and deciding a request transmission power in view of power efficiency in a base station according to the first modified example of the present embodiment.

Further, a process of grouping the slave devices and deciding the request transmission power in view of the power efficiency in the base station according to the present modified example will be described with reference to FIG. 19. FIG. 19 is a flowchart conceptually illustrating the process of grouping the slave devices and deciding the request transmission power in view of power efficiency in the base station according to the first modified example of the present embodiment. Further, description of processes that are substantially the same as the processes in the second embodiment will be omitted.

First, the base station executes grouping of the connected slave devices (step S241), and decides the request transmission power for each group on the basis of the channel information of the slave devices belonging to the group (step S242).

Then, the base station determines whether or not the power efficiency of the slave device at the request transmission power is sufficiently high (step S243). Specifically, the control unit 17 acquires the high-efficiency transmission power included in the received transmission power information notification for each of the slave devices. Then, the control unit 17 determines whether or not the request transmission power coincides with the acquired high-efficiency transmission power. The control unit 17 may determine whether or not a difference between the request transmission power and the high-efficiency transmission power is a threshold value or less or determine whether or not the request transmission power is within a range indicated by the high-efficiency transmission power when the high-efficiency transmission power is information indicating the range of the transmission power.

When the power efficiency of the slave device at the request transmission power is determined to be sufficiently high, the base station determines whether or not the request transmission power is within the transmission output adjustable range of each slave device (step S244). Further, when it is determined in step S243 that the power efficiency of the slave device at the request transmission power is not sufficiently high or that the request transmission power is not within the transmission output adjustable range of each slave device, grouping is newly performed on the connected slave devices (step S245). Then, the process returns to step S242.

Further, the transmission power at which the performance of the slave device is improved may be the transmission power at which the transmission signal characteristic is improved. For example, the transmission signal characteristic may be an SN ratio for the radio wave transmitted from the slave device which is measured in the base station or linearity of the amplifying unit 16 such as the power amplifier of the slave device. Further, a transmission power information notification including information indicating the transmission power related to the transmission signal characteristic in the present modified example will be described in detail with reference to FIG. 20. FIG. 20 is a diagram illustrating another configuration example of the transmission power information notification in the first modified example of the present embodiment.

As illustrated in FIG. 20, the transmission power information notification includes fields such as Element ID, Length, minimum transmission power, maximum transmission power, and good characteristic transmission power. For example, a transmission power value at which the transmission signal characteristic of the slave device is higher than when it is set to other transmission power is stored in a field "good characteristic transmission power" illustrated in FIG. 20.

Figure 21:
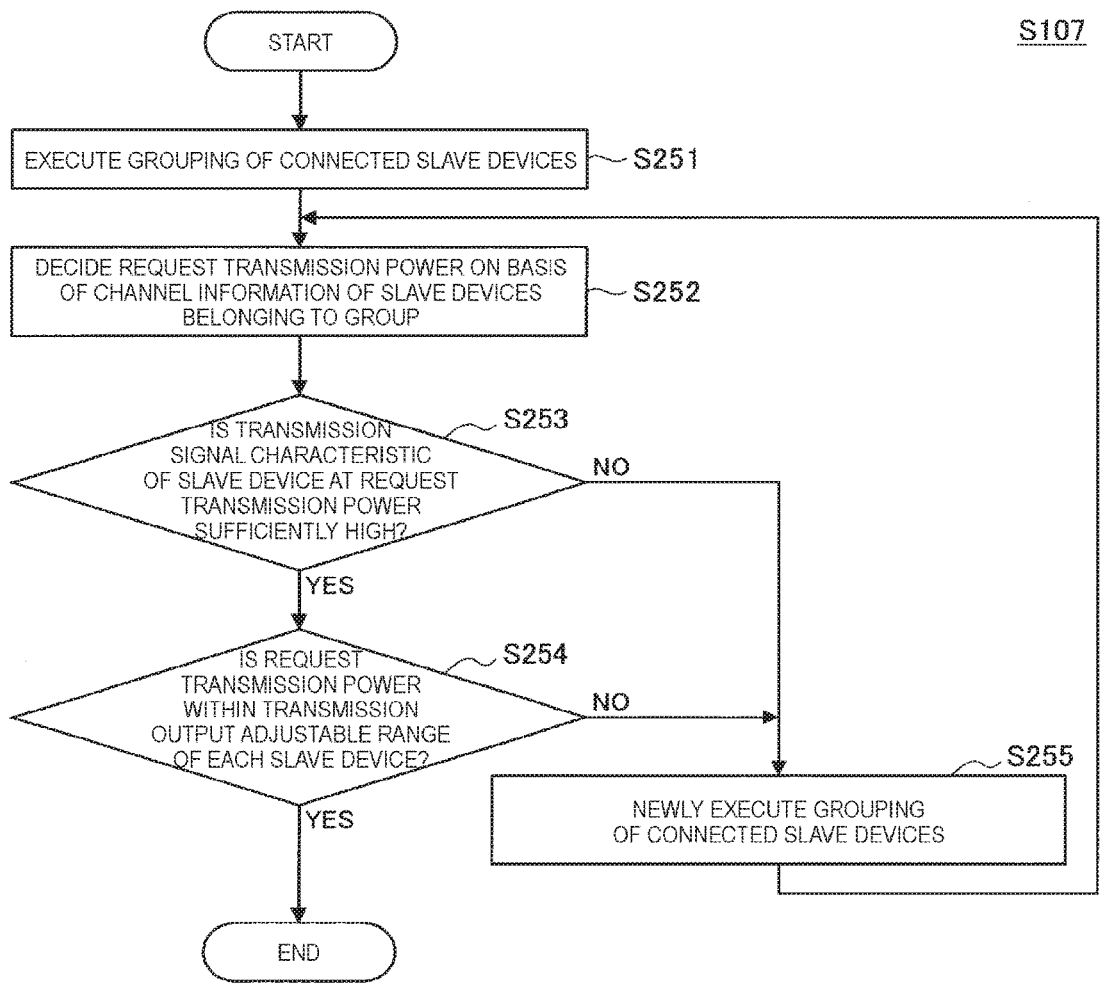
FIG. 21 is a flowchart conceptually illustrating a process of grouping slave devices and deciding a request transmission power in view of a transmission signal characteristic in a base station according to the first modified example of the present embodiment.

Then, a process of grouping the slave devices and deciding the request transmission power in view of the transmission signal characteristic in the base station according to the present modified example will be described with reference to FIG. 21. FIG. 21 is a flowchart conceptually illustrating the process of grouping slave devices and deciding a transmission power in view of the transmission signal characteristic in the base station according to the first modified example of the present embodiment. Further, description of processes that are substantially the same as the processes in the second embodiment will be omitted.

First, the base station executes grouping of the connected slave devices (step S251) and decides the request transmission power for each group on the basis of the channel information of the slave devices belonging to the group (step S252).

Then, the base station determines whether or not the transmission signal characteristic of the slave device at the request transmission power is sufficiently high (step S253). Specifically, the control unit 17 acquires the good characteristic transmission power included in the received transmission power information notification for each of the slave devices. Then, the control unit 17 determines whether or not the request transmission power coincides with the acquired good characteristic transmission power. The control unit 17 may decide whether or not a difference between the request transmission power and the good characteristic transmission power is a threshold value or less or may decide whether or not the request transmission power is within a range indicated by the good characteristic transmission power when the good characteristic transmission power is information indicating the range of the transmission power.

When the transmission signal characteristic of the slave device at the request transmission power is determined to be sufficiently high, the base station determines whether or not the request transmission power is within the transmission output adjustable range of each slave device (step S254). When it is determined in step S253 that the transmission signal characteristic of the slave device at the request transmission power is not sufficiently high or that the request transmission power is not within the transmission output adjustable range of each slave device, grouping is newly performed on the connected slave device (step S255). Then, the process returns to step S252.

Thus, according to the first modified example of the present embodiment, the base station decides the transmission power indicated by the transmission power setting request, that is, the request transmission power on the basis of the information indicating the transmission power at which the performance of each of the slave devices is improved to be higher than when the channel information and other transmission power are set. Therefore, it is possible to improve the performance of each slave device related to the transmission power while maintaining the communication efficiency.

Further, the performance of the slave device includes the power efficiency or the transmission signal characteristic for the transmission signal. Therefore, the power efficiency for the transmission signal is improved, the power consumption is suppressed, and the transmission signal characteristic is improved, and thus it is possible to improve a transmission success probability.

Second Modified Example

As the second modified example of the present embodiment, the base station may decide the request transmission power as the transmission power on the basis of information related to a power source of the slave device. Specifically, the control unit 17 decides the request transmission power on the basis of the channel information and the information related to the power source included in each of a plurality of slave devices (hereinafter also referred to as "power source information"). For example, the power source information may be information indicating a type of power source, a remaining battery level, a voltage, an electric current, electric power, or the like. Further, the power source information is added to the transmission power information notification. Further, a transmission power information notification including the power source information of the present modified example will be described in detail with reference to FIG. 22. FIG. 22 is a diagram illustrating a configuration example of the transmission power information notification in the second modified example of the present embodiment.

As illustrated in FIG. 22, the transmission power information notification includes fields such as Element ID, Length, minimum transmission power, maximum transmission power, and power source information. For example, the power source information of the slave device, for example, a value indicating a power source type or a remaining battery level is stored in a field "power source information" illustrated in FIG. 22.

Figure 23:
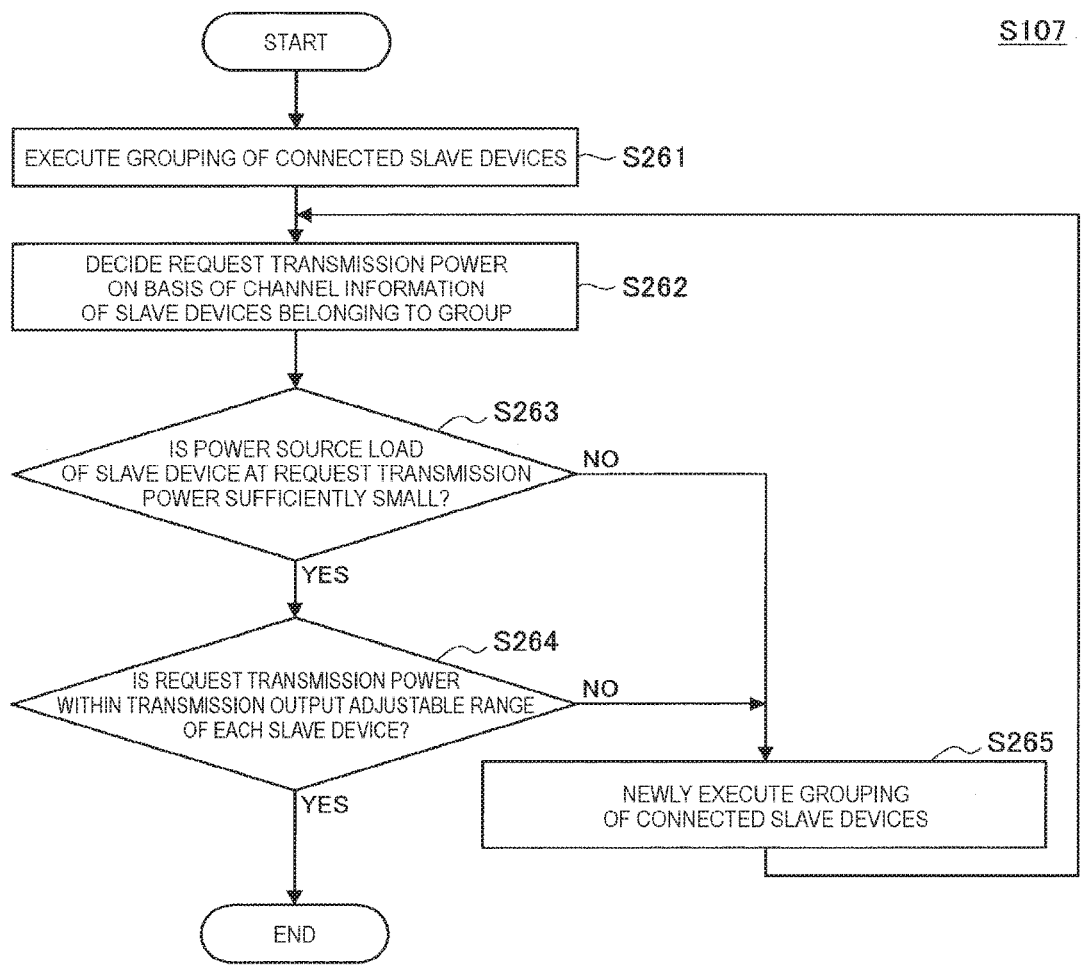
FIG. 23 is a flowchart conceptually illustrating a process of grouping slave devices and deciding a request transmission power in view of power source information in a base station according to the second modified example of the present embodiment.

Further, a process of grouping the slave devices and deciding the request transmission power in view of the power source information in the base station according to the present modified example will be described with reference to FIG. 23. FIG. 23 is a flowchart conceptually illustrating the process of grouping the slave devices and deciding the request transmission power in view of the power source information in the base station according to the second modified example of the present embodiment. Further, description of processes that are substantially the same as the processes in the second embodiment will be omitted.

First, the base station executes grouping of the connected slave devices (step S261) and decides the request transmission power for each group on the basis of the channel information of the slave devices belonging to the group (step S262).

Then, the base station determines whether or not a power source load of the slave device with respect to the request transmission power is sufficiently small (step S263). Specifically, the control unit 17 acquires the power source information included in the received transmission power information notification for each of the slave devices. Then, the control unit 17 determines whether or not the power source load with respect to the request transmission power is within an allowable range of a power source of a type indicated by the power source information. The control unit 17 may decide whether or not the remaining battery level of the slave device after transmission is performed at the request transmission power is a threshold value or more.

When the power source load of the slave device with respect to the request transmission power is determined to be sufficiently small, the base station determines whether or not the request transmission power is within the transmission output adjustable range of each slave device (step S264). Further, when it is determined in step S263 that the power source load of the slave device with respect to the request transmission power is not sufficiently small, or that the request transmission power is not within the transmission output adjustable range of each slave device, grouping is newly performed on the connected slave devices (step S265). Then, the process returns to step S262.

Thus, according to the second modified example of the present embodiment, the base station decides the transmission power indicated by the transmission power setting request, that is, the request transmission power on the basis of the channel information and the information related to the power source of each of a plurality of slave devices. Therefore, it is possible to maintain the communication efficiency without applying an excessive load to the power source of the slave device. Further, when the power source information indicates the power source type, an information transfer amount is reduced, and the load of the communication process is reduced. Further, when the power source information indicates the remaining battery level, the request transmission power is decided in accordance with the remaining battery level, and thus power depletion of the slave device or the like is suppressed, and the stability and continuity of the communication system can be improved.

4. THIRD EMBODIMENT (RE-EXECUTION OF GROUPING)

The communication device 10-2 according to the second embodiment of the present disclosure has been described above. Then, the communication device 10-3 according to the third embodiment of the present disclosure will be described.

3-1. Configuration of Device

Figure 24:
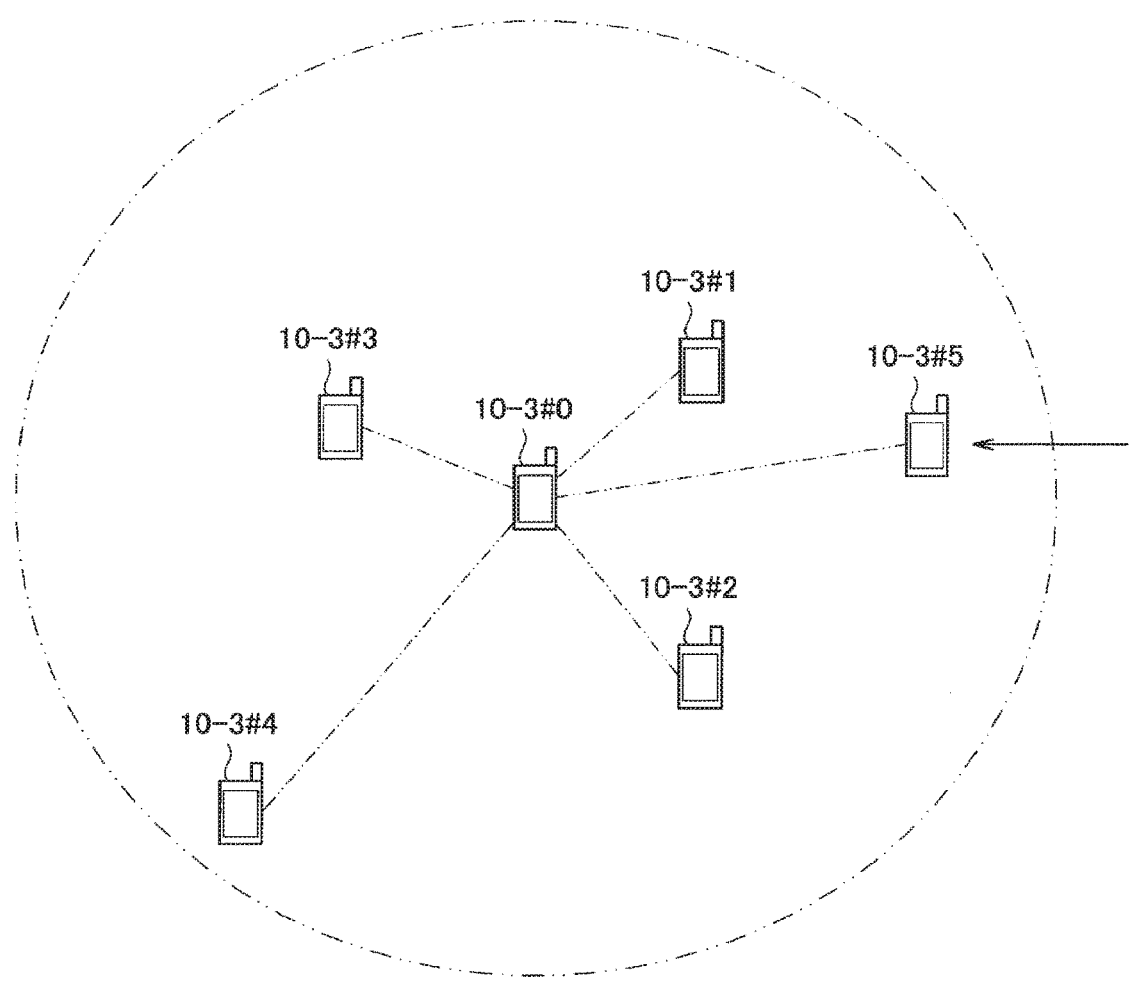
FIG. 24 is a diagram for describing a grouping re-execution process of a base station according to a third embodiment of the present disclosure.

A functional configuration of the communication device 10-3 is substantially the same as that of the first embodiment, but some functions of the base station are different. Further, descriptions of functions which are substantially the same as those of the first or second embodiment will be omitted.
((Function when Operating as Base Station))
Functions of the communication device 10-3 operating as the base station will be described in detail.
(Grouping Re-Execution Function)
The control unit 17 re-executes the process of grouping the slave devices when network information about the slave device changes after the grouping process. Specifically, the control unit 17 starts the process of grouping the slave devices when the presence or absence of a connection of the slave device changes after the grouping is completed. Further, a grouping re-execution process will be described in detail with reference to FIG. 24. FIG. 24 is a diagram for describing the grouping re-execution process of the base station according to the third embodiment of the present disclosure.

First, when a communication connection with the slave device is newly established, the control unit 17 acquires the channel information and the transmission power information for the slave device. For example, as illustrated in FIG. 24, a slave device 10-3#5 which has no connection with a base station 10-3#0 enters a communication range of the base station 10-3#0, and when the slave device 10-3#5 requests a communication connection, the communication unit 12 of the base station 10-3#0 establishes a communication connection with the slave device 10-3#5. Then, when the communication connection with the slave device 10-3#5 is newly established, the control unit 17 acquires the channel information and the transmission power information from the slave device 10-3#5 via the communication unit 12.

The channel information and the transmission power information acquired when the new communication connection is established may be acquired from only the slave device related to the new communication connection or may be acquired from each of the connected slave devices.

Then, when the channel information and the transmission power information of the newly connected slave device are acquired, the control unit 17 performs the grouping process. For example, when the channel information and the like are acquired, the control unit 17 performs the grouping process on each of the slave devices 10-3#1 to 10-3#5 connected to the base station 10-3#0 as illustrated in FIG. 24. Since the grouping process is substantially the same as the process described in the first embodiment or the like, description thereof is omitted.

Figure 25:
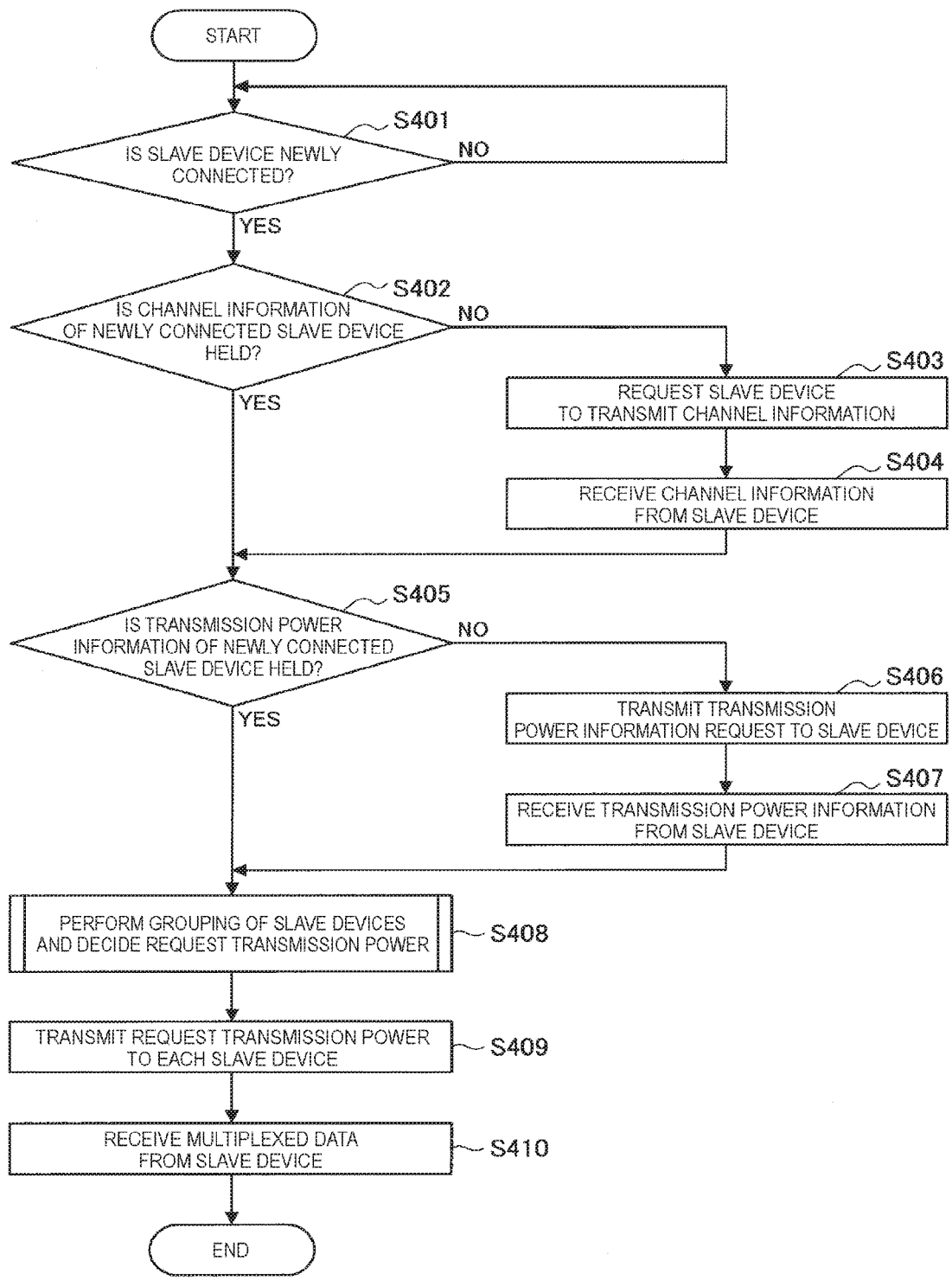
FIG. 25 is a flowchart conceptually illustrating an overview of a process of a base station according to the present embodiment.

3-2. Process of Device (Process of Base Station)
Then, an overview of a process of the base station according to the present embodiment will be described with reference to FIG. 25. FIG. 25 is a flowchart conceptually illustrating the overview of the process of the base station according to the present embodiment. Further, description of processes that are substantially the same as the processes in the first embodiment will be omitted. Further, a process of the slave device is substantially the same as the process in the first embodiment, and thus description thereof is omitted.

First, the base station is on standby until a slave device is newly connected (step S401). More specifically, when a communication connection is requested from a non-connected slave device, the communication unit 12 establishes a communication connection with the slave device and gives a notification indicating that a new communication connection has been established to the control unit 17.

When the slave device is newly connected, the base station determines the presence or absence of the channel information of the newly connected slave device (step S402). Specifically, when the new communication connection is established, the control unit 17 determines whether or not the channel information of the slave device related to the new communication connection is stored in a storage unit separately installed in the base station. When the channel information of the slave device is stored in the storage unit, the control unit 17 determines whether or not the channel information of the stored slave device has been acquired within a predetermined time. When the channel information is determined not to have been acquired within the predetermined time, the process proceeds to step S403, and when the channel information is determined to have been acquired within the predetermined time, the process proceeds to step S405.

When the base station is determined not to hold the channel information of the newly connected slave device, the base station requests the slave device to transmit the channel information (step S403) and receives the channel information from the slave device (Step S404).

Then, the base station determines the presence or absence of the transmission power information of the newly connected slave device (step S405). Specifically, the control unit 17 determines whether or not the transmission power information of the slave device related to the new communication connection is stored in a storage unit separately installed in the base station. When the transmission power information of the slave device is stored in the storage unit, the control unit 17 determines whether or not the transmission power information of the stored slave device has been acquired within a predetermined time. When the transmission power information is determined not to have been acquired within the predetermined time, the process proceeds to step S406, and when the transmission power information is determined to have been acquired within the predetermined time, the process proceeds to step S408.

When the base station is determined not to hold the transmission power information of the newly connected slave device, the base station transmits the transmission power information request to the slave device (step S406) and receives the transmission power information from the slave device (step S407).

Then, the base station executes the grouping of the slave devices and decides the request transmission power (step S408) and transmits the request transmission power to each slave device (step S409). Specifically, the control unit 17 re-executes the grouping process and the request transmission power decision process on each of the slave devices connected to the base station including the slave device related to the new communication connection. Then, the control unit 17 causes the communication unit 12 to transmit the transmission power setting request indicating the decided request transmission power to each slave device.

Then, the base station receives the multiplexed data from the slave device (step S410).

Thus, according to the third embodiment of the present disclosure, the base station re-executes the grouping when the network information about the slave device changes after the grouping of the slave devices. Therefore, since the request transmission power is decided in accordance with a change in the network, it is possible to appropriately set the transmission power of the slave device in the network after the change.

Further, the network information about the slave device includes information indicating whether or not the slave device is connected. Therefore, since the group and the request transmission power are reviewed in accordance with the number of connected slave devices, the change in the connected slave device, or the like, it is possible to suppress the occurrence of variation in the reception power which is caused by an additional connection of the slave device.

The example in which the request transmission power decision and the grouping are re-executed when a new communication connection is added has been described above, but the slave device related to the new communication connection may be added to the existing group, and a notification of transmission power setting information indicating the existing request transmission power may be given to the slave device related to the new communication connection.

Further, when the request transmission power does not change in the re-execution of grouping, the transmission power setting information may be transmitted only to the slave device related to the new communication connection.

3-3. Modified Examples

The third embodiment of the present disclosure has been described above. The present embodiment is not limited to the above example. First to third modified examples of the present embodiment will be described below.

First Modified Example

Figure 26:
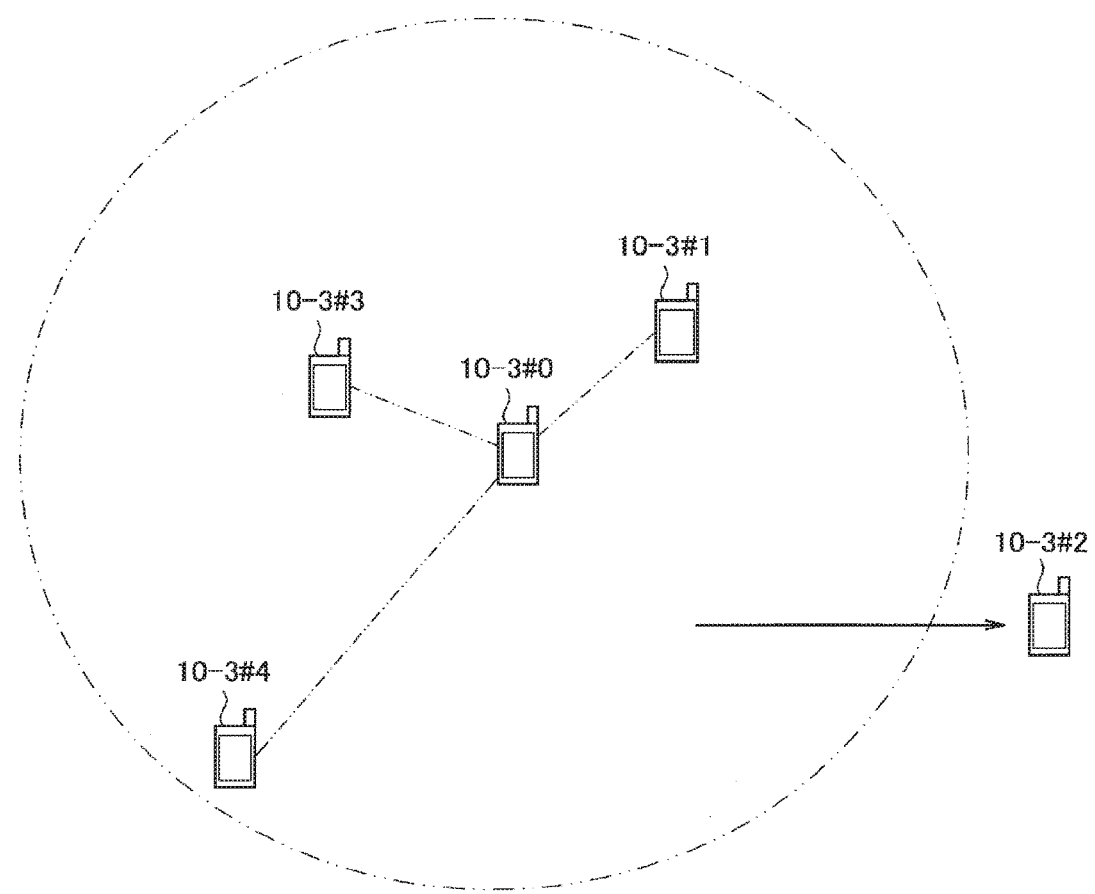
FIG. 26 is a diagram for describing a grouping re-execution process of a base station according to a first modified example of the present embodiment.

As the first modified example of the present embodiment, the base station may re-execute the grouping when the communication connection with the slave device is disconnected. Specifically, when the communication connection with the connected slave device is disconnected, the control unit 17 re-executes the grouping for each of the remaining slave devices. Further, a process of the present modified example will be described in detail with reference to FIG. 26. FIG. 26 is a diagram for describing a grouping re-execution process of the base station according to the first modified example of the present embodiment.

First, when the communication connection with the connected slave device is disconnected, the control unit 17 acquires the channel information and the transmission power information for the remaining slave devices. For example, a slave device 10-3#2 connected to the base station 10-3#0 moves outside the communication range of the base station 10-3#0 as illustrated in FIG. 26. Then, when the communication connection with the slave device 10-3#2 is disconnected, the control unit 17 of the base station 10-3#0 acquires the stored channel information and the transmission power information related to the remaining connected slave devices 10-3#1 to 10-3#4 from the storage unit. Further, the channel information and transmission power information may be acquired again from the remaining slave devices 10-3#1 to 10-3#4 via communication.

Then, the control unit 17 executes the grouping process. For example, the control unit 17 performs the grouping process on each of the connected slave devices 10-3#1 to 10-3#4 as illustrated in FIG. 26. Since the grouping process is substantially the same as the process described in the first embodiment or the like, description thereof is omitted.

Figure 27:
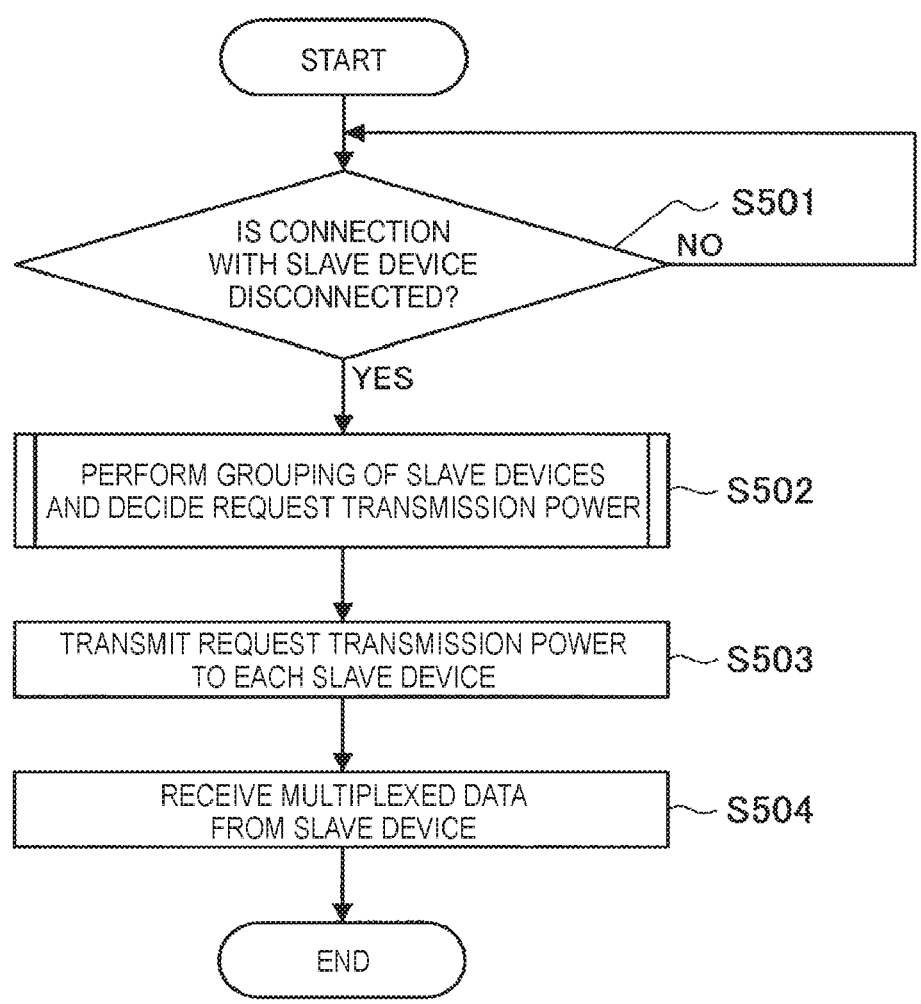
FIG. 27 is a flowchart conceptually illustrating an overview of a process of the base station according to the first modified example of the present embodiment.
Figure 28:
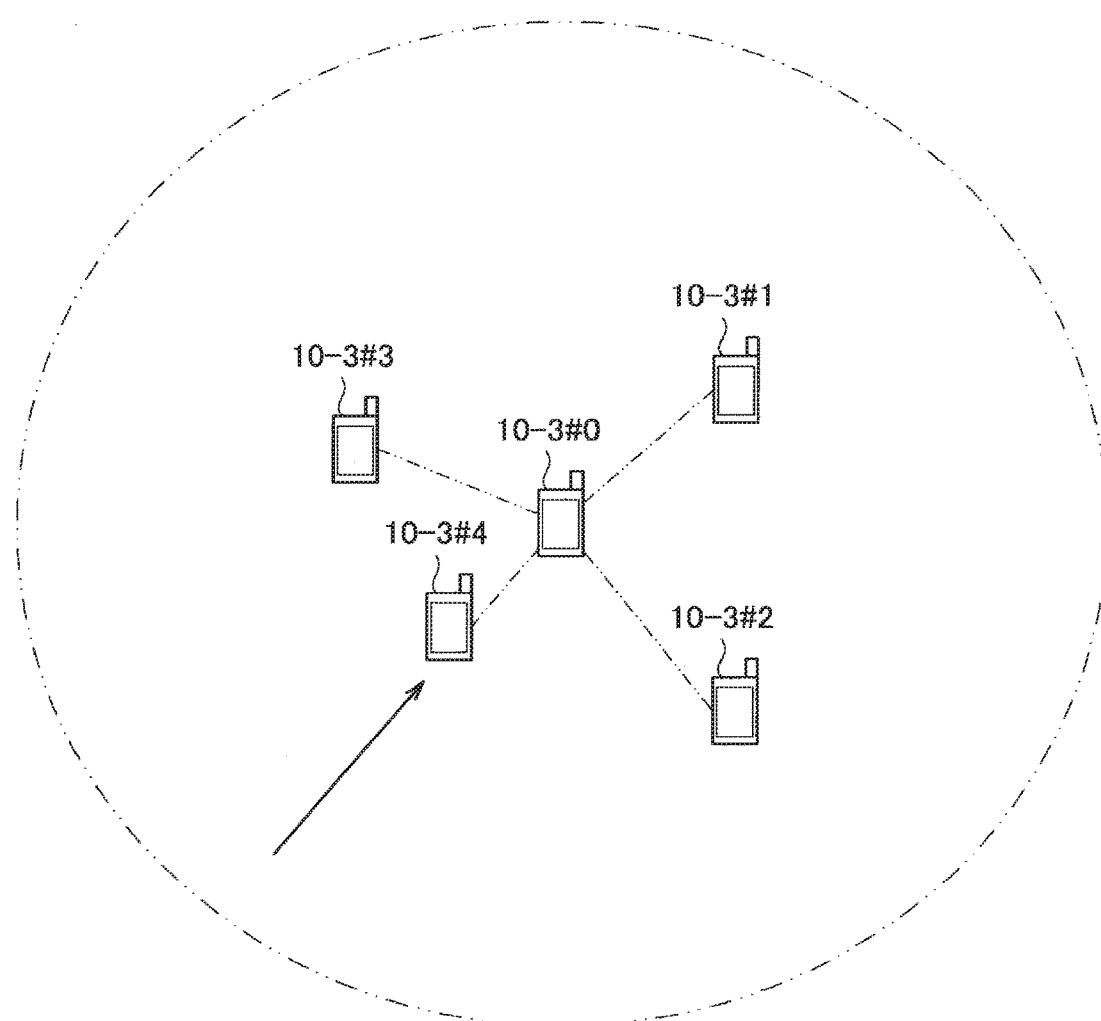
FIG. 28 is a diagram for describing a grouping re-execution process of a base station according to a second modified example of the present embodiment.

Further, an overview of a process of the base station according to the present modified example will be described with reference to FIG. 27. FIG. 27 is a flowchart conceptually illustrating the overview of the process of the base station according to the first modified example of the present embodiment. Further, description of processes that are substantially the same as the processes in the first to third embodiments will be omitted. Further, a process of the slave device is substantially the same as the process in the first embodiment, and thus description thereof is omitted.

First, the base station is on standby until the connection with the slave device is disconnected (step S501). Specifically, when the communication connection with the connected slave device is disconnected, the communication unit 12 gives a notification indicating that the communication connection has been disconnected to the control unit 17.

When the connection with the slave device is disconnected, the base station executes the grouping of the slave devices and decides the request transmission power (step S502) and transmits the request transmission power to each slave device (step S503). Then, the base station receives the multiplexed data from the slave device (step S504).

Further, when the request transmission power does not change in the re-execution of grouping, a notification of the request transmission power, that is, transmission of the transmission power setting information may not be performed.

Thus, according to the first modified example of the present embodiment, the base station re-executes the grouping when the communication connection with the slave device is disconnected. Thus, since the group and the request transmission power related to multiplexing are reviewed when the communication connection with the slave device is disconnected, the transmission power of the slave device can be appropriately set.

Second Modified Example

As the second modified example of the present embodiment, the base station may re-execute the grouping of the slave devices in a state in which the communication connection with the slave device is continued. Specifically, when the channel information of the connected slave device changes, the control unit 17 re-executes the grouping of the slave devices. Further, a process of the present modified example will be described in detail with reference to FIG. 27. FIG. 27 is a diagram for describing a grouping re-execution process of the base station according to the second modified example of the present embodiment.

First, the control unit 17 determines whether or not the channel information of the connected slave device has changed. Specifically, the control unit 17 of the base station requests each slave device to determine whether or not the channel information has changed via the communication unit 12. The request for the determination about whether or not the channel information has changed may be performed periodically. Then, the communication unit 12 of the slave device that receives the request for the determination about whether or not the channel information has changed measures the channel using the determination request or the like transmitted from the base station, and the control unit 17 of the slave device compares the channel information obtained by the measurement with previous channel information. Then, when the channel information is determined to have changed, the control unit 17 causes the communication unit 12 to transmit a frame including information indicating that the channel information has changed to the base station. When the information indicating that the channel information has changed is received from the slave device, the control unit 17 of the base station decides that the channel information of the slave device has changed.

For example, when a slave device 10-3#4 connected with the base station 10-3#0 enters the communication range of the base station 10-3#0 as illustrated in FIG. 27, the channel information of the slave device 10-3#4 may change. Then, the slave device 10-3#4 that receives the request for the determination about whether or not the channel information has changed from the base station 10-3#0 measures the channel and determines whether or not the channel information has changed. When the channel information is determined to have changed, a notification indicating that the channel information has changed is given to the base station 10-3#0.

When the channel information of the connected slave device is determined to have changed, the channel information about the slave device associated with the change is acquired. Since the process of acquiring the channel information is substantially the same as the process in the first embodiment, description thereof is omitted. Further, the channel information may be acquired from all the connected slave devices.

When the channel information about the slave device associated with the change is acquired, the control unit 17 executes the grouping process. Since the grouping process is substantially the same as the process in the first embodiment, description thereof is omitted. For the slave device whose the channel information has not changed, the channel information stored in the storage unit is used.

Figure 29:
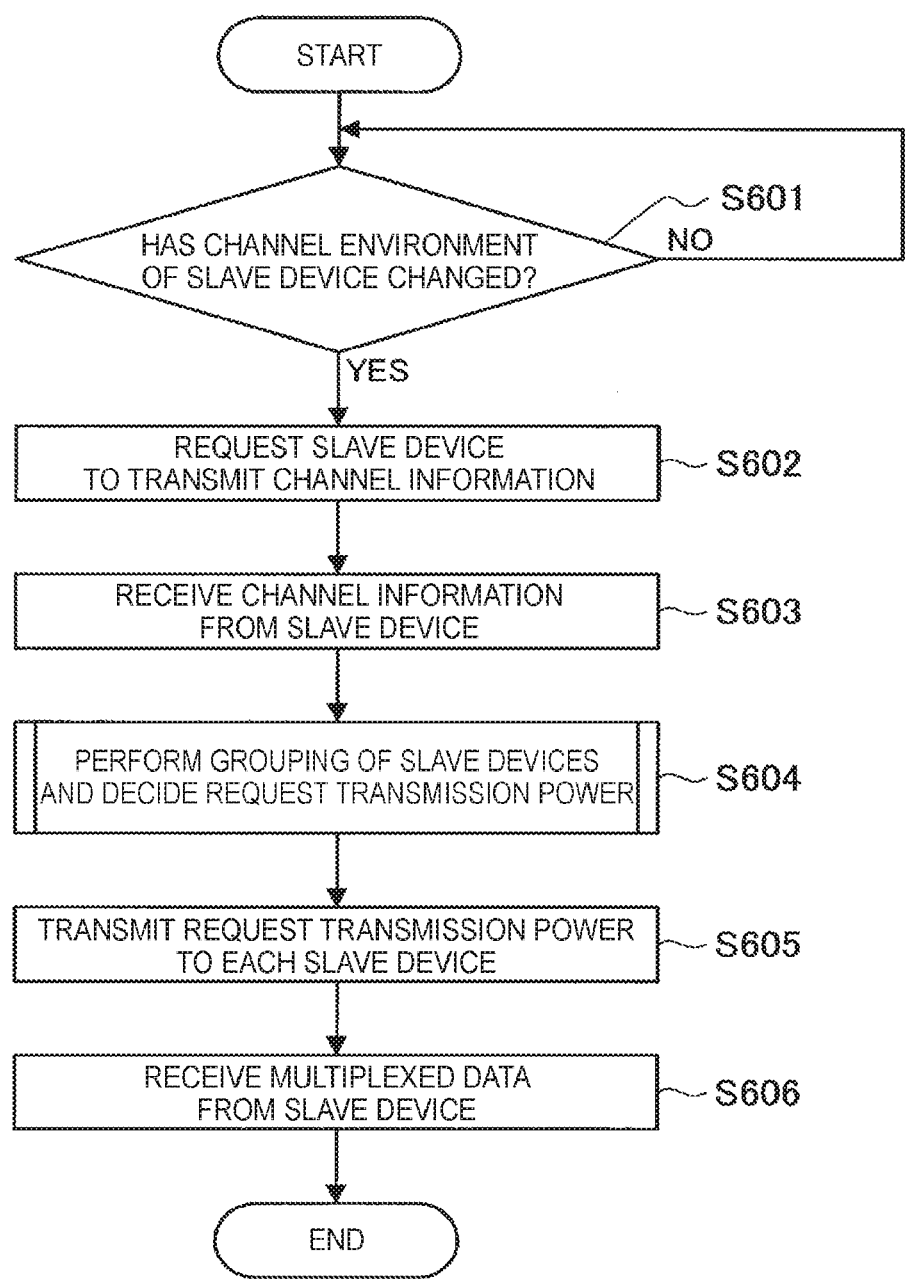
FIG. 29 is a flowchart conceptually illustrating an overview of a process of the base station according to the second modified example of the present embodiment.

Further, an overview of a process of the base station according to the present modified example will be described with reference to FIG. 29. FIG. 29 is a flowchart conceptually illustrating the overview of the process of the base station according to the second modified example of the present embodiment. Further, the description of processes that are substantially the same as the processes in the first to third embodiments will be omitted. Further, a process of the slave device is substantially the same as the process in the first embodiment, and thus description thereof is omitted.

First, the base station determines whether or not the channel environment of the slave device has changed (step S601). Specifically, the control unit 17 requests each slave device to determine whether or not the channel information has changed and is on standby for a response from each slave device. Then, when the notification indicating that the channel information has changed is responded from the slave device, the channel information of the slave device is determined to have changed.

When the channel environment is determined to have changed, the base station requests the slave device to transmit the channel information (step S602), and receives the channel information from the slave device (step S703).

Then, the base station executes the grouping of the slave devices and decides the request transmission power (step S604) and transmits the request transmission power to each slave device (step S605). The base station then receives the multiplexed data from the slave device (step S606).

The example in which the base station requests the determination about whether or not the channel information has changed has been described above, but the slave device may autonomously determine whether or not the channel information has changed. For example, the control unit 17 of the slave device periodically measures the channel using the radio wave received from the base station and determines whether or not the channel information has changed. Then, when the channel information is determined to have changed, the control unit 17 gives a notification indicating that the channel information has changed to the base station through the communication unit 12.

Thus, according to the second modified example of the present embodiment, the base station re-executes the grouping of the slave devices when the channel information of the connected slave device changes. Therefore, it is possible to suppress the occurrence of variations in the reception power when the presence/absence of a connection does not change.

Third Modified Example

Figure 30:
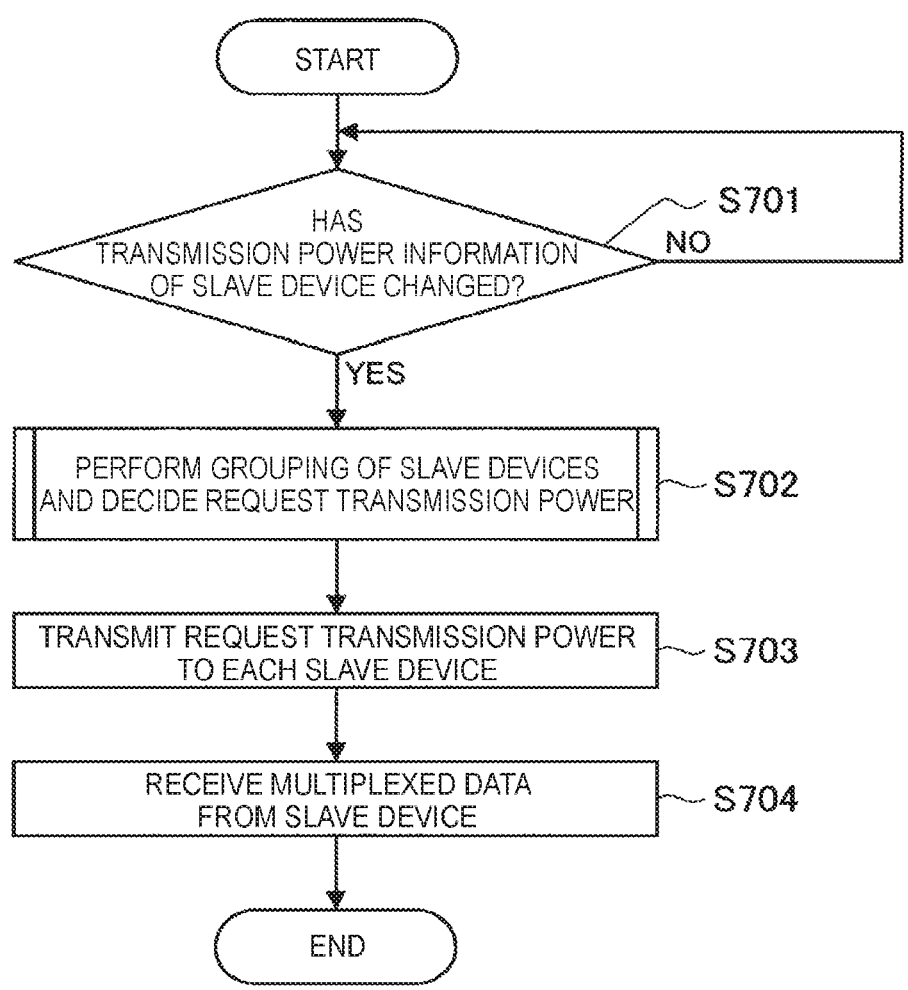
FIG. 30 is a flowchart conceptually illustrating an overview of a process of the base station according to a third modified example of the present embodiment.

As the third modified example of the present embodiment, the base station may re-execute the grouping when the transmission power information of the slave device changes. Specifically, the control unit 17 of the slave device generates transmission power information notification including transmission power information indicating a changed transmission output adjustable range when the transmission power information of its own device, for example, the transmission output adjustable range changes (hereinafter referred to as "transmission power information notification after change") and causes the communication unit 12 to transmit the transmission power information notification to the base station. The control unit 17 of the base station re-executes the grouping of the slave devices on the basis of the transmission power information indicated by the received transmission power information notification after the change. Further, a process of the present modified example will be described in detail with reference to FIG. 30. FIG. 30 is a flowchart conceptually illustrating an overview of a process of the base station according to the third modified example of the present embodiment. Further, description of processes that are substantially the same as the processes in the first to third embodiments will be omitted. Further, a process of the slave device is substantially the same as the process in the first embodiment except for a process of notifying the base station of the changed transmission power information, and thus description thereof is omitted.

First, the base station determines whether or not the transmission power information of the slave device has changed (step S701). Specifically, when the transmission power information notification after the change is received from the connected slave device, the control unit 17 acquires the transmission power information from the transmission power information notification.

When the transmission power information of the slave device is determined to have changed, the base station executes the grouping of the slave devices and decides the request transmission power (step S702). Specifically, the base station performs the decision of the request transmission power and the grouping using the channel information, the transmission power information, and the changed transmission power information of each of the slave devices for each of the connected slave devices.

Then, the base station transmits the request transmission power to each slave device (step S703). Then, the base station receives the multiplexed data from the slave device (step S704).

The example in which the grouping process is re-executed on the basis of the change in the transmission power information has been described above, but the grouping process may be re-executed on the basis of a change in other information related to the transmission power. For example, the control unit 17 re-executes the grouping process on the basis of information that changes in accordance with the magnitude of the transmission power such as the power consumption information, information indicating the transmission power at which the performance of the slave device is improved, or a change in the power source information.

As described above, according to the third modified example of the present embodiment, the base station re-executes the grouping when the transmission power information of the slave device changes. Therefore, when it is difficult to set the request transmission power in the slave device, the request transmission power is changed, and thus it is possible to suppress the reduction in the transmission opportunity and the reduction in the communication efficiency.

Further, when the transmission power information changes, the slave device transmits the frame including the transmission power information. Thus, the new transmission power information is autonomously transferred to the base station, it is possible to simplify the communication process of the base station and prevent an increase in a communication amount.

5. APPLICATION EXAMPLE

The technology according to the embodiments of the disclosure can be applied to various products. For example, the communication device 10 that operates as a slave unit may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the slave unit may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the slave unit may be wireless communication modules mounted in such terminals (for example, integrated circuit modules configured by one die).

On the other hand, for example, the communication device 10 that operates as a base station may be realized as a wireless LAN access point (also referred to as a wireless base station) which has a router function or does not have a router function. The base station may be realized as a mobile wireless LAN router. The base station may also be a wireless communication module (for example, an integrated circuit module configured with one die) mounted on the device.

5-1. First Application Example

Figure 31:
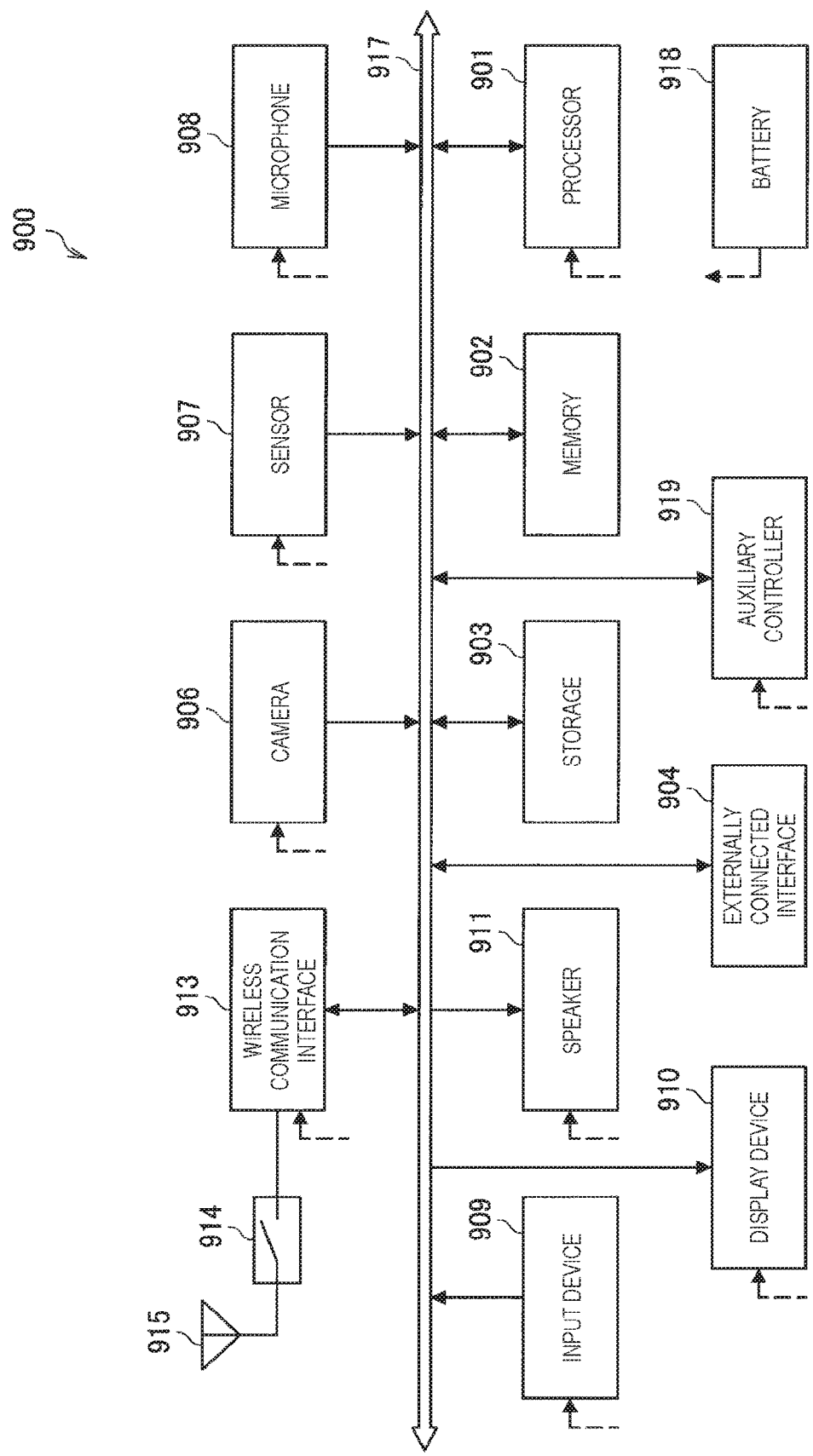
FIG. 31 is a block diagram showing an example schematic configuration of a smartphone.

FIG. 31 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED)

display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 31. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 31 via power supply lines partially indicated by dashed lines in the drawing. The auxiliary controller 919 causes, for example, necessary minimum functions of the smartphone 900 to be operated in a sleep mode.

In the smartphone 900 shown in FIG. 31, the data processing unit 11, the communication unit 12, and the control unit 17 described with reference to FIG. 2 may be mounted in the wireless communication interface 913. At least some of the functions may be mounted on the processor 901 or the auxiliary controller 919. For example, the control unit 17 causes the amplifying unit 16 to set the transmission power to the request transmission power received from the base station through the communication unit 12, and thus it is possible to improve the communication characteristic of the radio wave transmitted from the slave device while maintaining the communication efficiency of the slave device and the entire communication system.

Note that the smartphone 900 may operate as a wireless access point (software AP) as the processor 901 executes the function of an access point at an application level. In addition, the wireless communication interface 913 may have the function of a wireless access point.

5-2. Second Application Example

Figure 32:
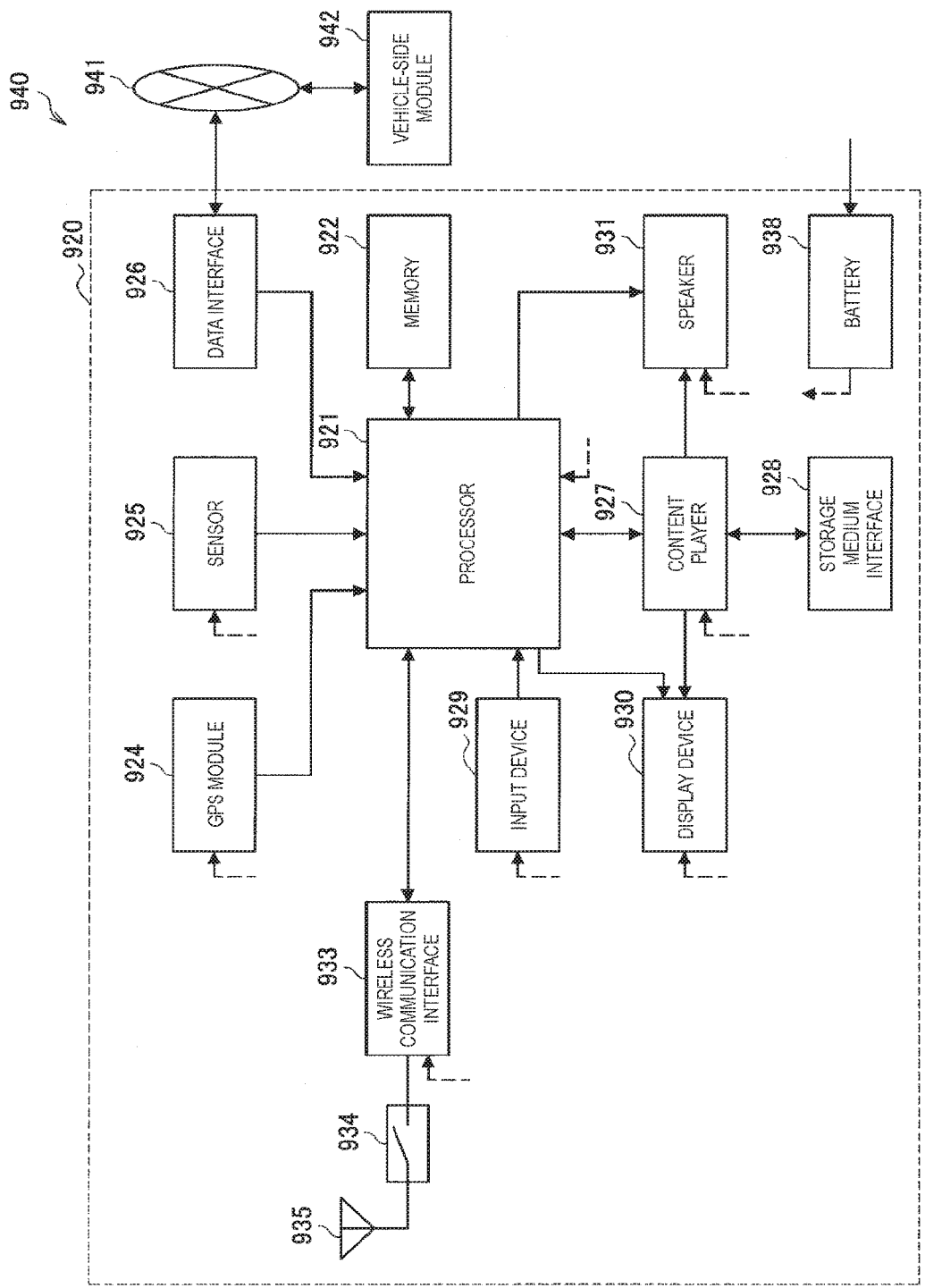
FIG. 32 is a block diagram showing an example schematic configuration of a car navigation device.

FIG. 32 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 32. In this case, the antenna switch 934 may be omitted from the configuration of the car navigation device 920.

The battery 938 supplies electric power to each of the blocks of the car navigation device 920 shown in FIG. 32 via power supply lines partially indicated by dashed lines in the drawing. In addition, the battery 938 accumulates electric power supplied from the vehicle.

In the car navigation device 920 shown in FIG. 32, the data processing unit 11, the communication unit 12, and the control unit 17 described with reference to FIG. 2 may be mounted in the wireless communication interface 933. At least some of the functions may be mounted on the processor 921. For example, the control unit 17 causes the amplifying unit 16 to set the transmission power to the request transmission power received from the base station through the communication unit 12, and thus it is possible to improve the communication characteristic of the radio wave transmitted from the slave device while maintaining the communication efficiency of the slave device and the entire communication system.

Further, the wireless communication interface 933 may operate as the base station described above and may provide a wireless connection to a terminal of a user riding in a vehicle. At that time, for example, the control unit 17 decides the request transmission power on the basis of the channel information and the transmission power information received from each of the slave devices through the communication unit 12, and transmits the request transmission power to the slave device via the communication unit 12. Accordingly, it is possible to improve the communication characteristic of the radio waves transmitted by the slave device while maintaining the communication efficiency of the slave device and the entire communication system.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

5-3. Third Application Example

Figure 33:
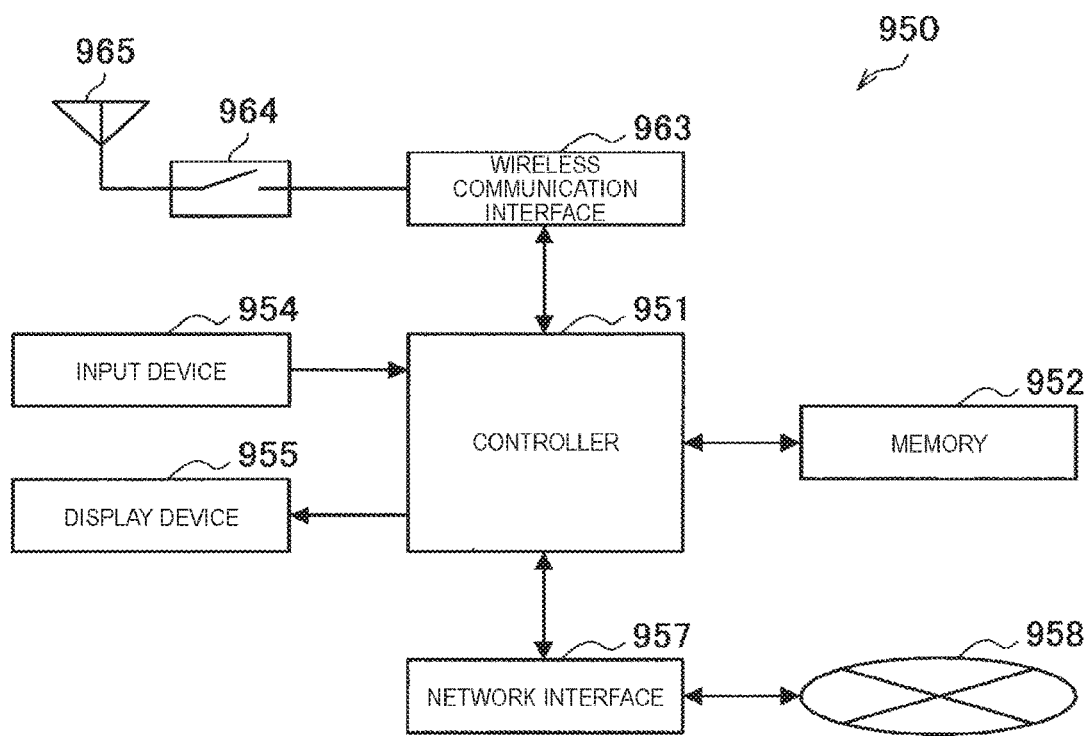
FIG. 33 is a block diagram showing an example schematic configuration of a wireless access point.

FIG. 33 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RANI and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 33, the data processing unit 11, the communication unit 12, and the control unit 17 described with reference to FIG. 2 may be mounted on the wireless communication interface 963. At least some of the functions may be mounted on the controller 951. For example, the control unit 17 decides the request transmission power on the basis of the channel information and the transmission power information received from each of the slave devices through the communication unit 12, and transmits the request transmission power to the slave device via the communication unit 12. Accordingly, it is possible to improve the communication characteristic of the radio waves transmitted by the slave device while maintaining the communication efficiency of the slave device and the entire communication system.

6. CONCLUSION

According to the first embodiment of the present disclosure, when the transmission of the slave device which is given the notification of the transmission power outside the transmission output adjustable range is not suppressed, the densities of the reception signals received from the slave devices performing the multiplexing communication become uniform, and thus it is possible to suppress the deterioration in the reception characteristic and suppress the increase in the communication error. Further, when the transmission of the slave device which is given the notification of the transmission power outside the transmission output adjustable range is suppressed, the reduction in the transmission opportunity of each of the slave devices is suppressed, and thus it is possible to control the transmission power while maintaining the communication efficiency.

According to the second embodiment of the present disclosure, since the request transmission power is decided while considering influence on the slave device when the transmission power is set to the request transmission power, and thus it is possible to suppress the influence on the slave device when the transmission power is designated while maintaining the communication efficiency.

According to the third embodiment of the present disclosure, since the request transmission power is decided in accordance with a change in the network, it is possible to appropriately set the transmission power of the slave device in the network after the change.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the frames are multiplexed using the space division multiplexing scheme, but the present technology is not limited to the above examples. For example, the frames may be multiplexed using the frequency division multiplexing scheme or the time division multiplexing scheme.

In the above embodiments, the example in which the request transmission power is decided such that the reception power falls within a predetermined range has been described above, but the request transmission power may be decided so that the reception power is a predetermined value.

In the above embodiments, as the example of the process of grouping the slave devices, the example in which the request transmission power is decided after the grouping has been described above, but after the request transmission power is temporarily decided, the grouping may be performed on the basis of provisional request transmission power. Further, the grouping may be performed on the basis of the priority of the traffic, the power consumption information, the transmission power information related to the performance of the slave device, or the power source information.

Further, in the above embodiments, the examples of several frame configurations have been described, but two or more of the frame configurations described may be combined.

In the above embodiments, the example in which the grouping is re-executed when the network information, the transmission power information, or the like changes, but the grouping may be re-executed at regular intervals. Further, the grouping may be re-executed when the information about the reception signal related to the radio wave received from the slave device in the base station changes. For example, the control unit 17 re-executes the grouping when the reception power or the SN ratio or the like of the reception signal changes.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication device, including:
a control unit configured to select other communication devices capable of setting transmission power such that reception power falls within a predetermined range, from a plurality of other communication devices that perform multiplexing communication; and
a communication unit configured to transmit a transmission power setting request indicating the transmission power to each of the other communication devices selected by the control unit.

(2)
The communication device according to (1),
in which the communication unit receives transmission power information indicating a transmission power range that is settable by each of the plurality of other communication devices,
the control unit performs the selection such that the transmission power indicated by a transmission power setting request generated on the basis of channel information in communication with the plurality of other communication devices falls within the transmission power range indicated by the transmission power information received by the communication unit.

(3)
The communication device according to (2),
in which the transmission power information includes information indicating a transmission power range corresponding to a frequency bandwidth, MCS information, or a channel identifier used in each of the plurality of other communication devices.

(4)
The communication device according to (2) or (3),
in which the transmission power information includes information indicating a transmission power range corresponding to a priority of traffic of each of the plurality of other communication devices.

(5)
The communication device according to any one of (2) to (4),
in which the control unit decides the transmission power indicated by the transmission power setting request on the basis of information that changes in accordance with the channel information and a magnitude of the transmission power.

(6)
The communication device according to (5),
in which the information that changes in accordance with the magnitude of the transmission power includes information indicating power consumption corresponding to the transmission power.

(7)
The communication device according to any one of (2) to (4),
in which the control unit decides the transmission power indicated by the transmission power setting request on the basis of the channel information and information indicating transmission power at which performance of each of the plurality of other communication devices is improved to be higher than other transmission power.

(8)
The communication device according to (7),
in which the performance includes power efficiency or a transmission signal characteristic for a transmission signal.

(9)
The communication device according to any one of (2) to (4),
in which the control unit decides the transmission power indicated by the transmission power setting request on the basis of the channel information and information related to a power source included in each of the plurality of other communication devices.

(10)
The communication device according to any one of (2) to (9),
in which, after the selection, the control unit executes the selection again when network information about the plurality of other communication devices changes.

(11)

The communication device according to (10), in which the network information about the plurality of other communication devices includes the presence or absence of connection of the plurality of other communication devices, or the channel information.

(12)

The communication device according to any one of (2) to (11), in which, after the selection, the control unit executes the selection again when the transmission power information or other information related to the transmission power which is different from the transmission power information changes.

(13)

The communication device according to any one of (1) to (12), further including a processing unit configured to generate a frame related to the transmission power setting request, in which the communication unit transmits the frame generated by the processing unit.

(14)

A communication device, including:

a communication unit configured to transmit transmission power information indicating a settable transmission power range and receive a transmission power setting request indicating transmission power settable by the own device; and a control unit configured to set transmission power of the own device on the basis of the transmission power setting request received by the communication unit, in which the communication unit performs multiplexing communication at the transmission power set by the control unit.

(15)

The communication device according to (14), further including a processing unit configured to generate a frame including the transmission power setting request, in which the communication unit transmits the frame generated by the processing unit in the case where the transmission power information is requested or in the case where the transmission power information changes.

(16)

The communication device according to (15), in which the frame including the transmission power information includes other information related to the transmission power which is different from the transmission power information.

(17)

A communication method, including:

selecting, by a control unit, other communication devices capable of setting transmission power such that reception power falls within a predetermined range, from a plurality of other communication devices that perform multiplexing communication; and transmitting a transmission power setting request indicating the transmission power to each of the other communication devices selected by the control unit.

(18)

A communication method, including:

transmitting, by a communication unit, transmission power information indicating a settable transmission power range and receiving a transmission power setting request indicating transmission power settable by an own device;

setting transmission power of the own device on the basis of the transmission power setting request received by the communication unit; and performing multiplexing communication at the set transmission power.

(19)

A program causing a computer to implement:

a control function of selecting other communication devices capable of setting transmission power such that reception power falls within a predetermined range, from a plurality of other communication devices that perform multiplexing communication; and a communication function of transmitting a transmission power setting request indicating the transmission power to each of the other communication devices selected by the control function.

(20)

A program causing a computer to implement:

a communication function of transmitting transmission power information indicating a settable transmission power range and receiving a transmission power setting request indicating transmission power settable by an own device;

a control function of setting transmission power of the own device to the transmission power indicated by the transmission power setting request received by the communication function; and a function of performing multiplexing communication at the transmission power set by the control function.

REFERENCE SIGNS LIST 10 communication device, base station, and slave device
11 data processing unit
12 communication unit
13 signal processing unit
14 channel estimating unit
15 wireless interface unit
16 amplifying unit
17 control unit

The invention claimed is:

1. A communication device, comprising:

circuitry configured to select other communication devices capable of setting transmission power such that reception power falls within a predetermined range, from a plurality of other communication devices that perform multiplexing communication; and a communication interface configured to transmit a transmission power setting request indicating the transmission power to each of the other communication devices selected by the circuitry, wherein the circuitry is configured to generate a frame related to the transmission power setting request, and the communication interface transmits the frame generated by the circuitry, wherein the communication interface receives transmission power information indicating a transmission power range that is settable by each of the plurality of other communication devices, and the circuitry performs the selection such that the transmission power indicated by the transmission power setting request generated on the basis of channel information in communication with the plurality of other communication devices falls within the transmission power range indicated by the transmission power information received by the communication interface.

2. The communication device according to claim 1, wherein the transmission power information includes information indicating a transmission power range corresponding to information indicating a frequency bandwidth, a modulation scheme and a coding scheme, or a channel identifier used in each of the plurality of other communication devices.

3. The communication device according to claim 1, wherein the transmission power information includes information indicating a transmission power range corresponding to a priority of traffic of each of the plurality of other communication devices.

4. The communication device according to claim 1, wherein the circuitry decides the transmission power indicated by the transmission power setting request on the basis of information that changes in accordance with the channel information and a magnitude of the transmission power.

5. The communication device according to claim 4, wherein the information that changes in accordance with the magnitude of the transmission power includes information indicating power consumption corresponding to the transmission power.

6. The communication device according to claim 1, wherein the circuitry decides the transmission power indicated by the transmission power setting request on the basis of the channel information and information indicating transmission power at which performance of each of the plurality of other communication devices is improved to be higher than other transmission power.

7. The communication device according to claim 6, wherein the performance includes power efficiency or a transmission signal characteristic for a transmission signal.

8. The communication device according to claim 1, wherein the circuitry decides the transmission power indicated by the transmission power setting request on the basis of the channel information and information related to a power source included in each of the plurality of other communication devices.

9. The communication device according to claim 1, wherein, after the selection, the circuitry executes the selection again when network information about the plurality of other communication devices changes.

10. The communication device according to claim 9, wherein the network information about the plurality of other communication devices includes the presence or absence of connection of the plurality of other communication devices, or the channel information.

11. The communication device according to claim 1, wherein, after the selection, the circuitry executes the selection again when the transmission power information or other information related to the transmission power which is different from the transmission power information changes.

12. A communication method, comprising:

selecting, by circuitry, other communication devices capable of setting transmission power such that reception power falls within a predetermined range, from a plurality of other communication devices that perform multiplexing communication;

transmitting a transmission power setting request indicating the transmission power to each of the other communication devices selected by the circuitry;

generating a frame including the transmission power setting request, wherein the transmitting includes transmitting the frame in the case where transmission power information is requested or in the case where the transmission power information changes, and receiving with a communications interface the transmission power information indicating a transmission power range that is settable by each of the plurality of other communication devices, wherein the selecting includes selecting such that the transmission power indicated by the transmission power setting request generated on the basis of channel information in communication with the plurality of other communication devices falls within the transmission power range indicated by the transmission power information received by the communication interface.

* * * * *